US012639444B2

(12) United States Patent
Sharma et al.

(10) Patent No.: US 12,639,444 B2
(45) Date of Patent: May 26, 2026

(54) METHOD AND SYSTEM TO ENFORCE SECURITY ON DEVICES USING DEVICE MANAGEMENT LAYER

(71) Applicant: Tyco Fire & Security GmbH, Neuhausen am Rheinfall (CH)

(72) Inventors: Nidhi Sharma, Maharashtra (IN); John Steven Jilek, Grafton, WI (US); Christopher William James, Comber (GB)

(73) Assignee: Tyco Fire & Security GmbH, Neuhausen am Rheinfall (CH)

( * ) Notice: Subject to any disclaimer, the term of this patent is extended or adjusted under 35 U.S.C. 154(b) by 112 days.

(21) Appl. No.: 18/622,505

(22) Filed: Mar. 29, 2024

(65) Prior Publication Data

US 2024/0330472 A1     Oct. 3, 2024

(30) Foreign Application Priority Data

Mar. 31, 2023     (IN) .............................. 202321024639

(51) Int. Cl.
 *G06F 21/57* (2013.01)
 *G06F 21/55* (2013.01)
(52) U.S. Cl.
 CPC .......... *G06F 21/575* (2013.01); *G06F 21/554* (2013.01)
(58) Field of Classification Search
 CPC ............................. G06F 21/575; G06F 21/554
 See application file for complete search history.

(56) References Cited

U.S. PATENT DOCUMENTS

| | | | | |
|---|---|---|---|---|
| 2009/0158419 A1* | 6/2009 | Boyce | ................... | G06F 21/575 |
| | | | | 726/13 |
| 2018/0131715 A1* | 5/2018 | Hamdi | ....................... | G06F 7/24 |
| 2020/0184076 A1* | 6/2020 | McDonough | ......... | G06F 21/575 |
| 2022/0058271 A1* | 2/2022 | Rose | ..................... | G06F 9/4401 |

(Continued)

FOREIGN PATENT DOCUMENTS

EP          4060935 A1     9/2022

OTHER PUBLICATIONS

Extended European Search Report and Search Opinion received for European Application No. 24168158.4, mailed on May 10, 2024, 12 pages.

(Continued)

*Primary Examiner* — Zahid Choudhury
(74) *Attorney, Agent, or Firm* — ArentFox Schiff LLP

(57) ABSTRACT

A method to enforce security on a device by a device management client running on the device is provided. The method includes receiving a base product-platform profile of the device during a boot-up process of the device. The base product-platform profile indicates one or more control parameters of the device set at a time of installation of an application stack on the device. The method further includes comparing the one or more control parameters in the base product-platform profile with corresponding one or more control parameters in a real-time product-platform profile of the device. The method further includes detecting an attack to the device based on at least one of the one or more control parameters in the base product-platform profile being different from a corresponding control parameter in the real-time product-platform profile.

18 Claims, 9 Drawing Sheets

(56)         References Cited

U.S. PATENT DOCUMENTS

| 2022/0078238 A1* | 3/2022 | Nixon | .................. | G06F 9/4401 |
| 2022/0303779 A1* | 9/2022 | Boyapalle | ............. | H04W 12/35 |

OTHER PUBLICATIONS

Granzer et al., "Security in Building Automation Systems", IEEE Transactions on Industrial Electronic, vol. 57, No. 11, Dec. 2010, pp. 3622-3630 (10 pages).

Pietro Spadaccino et al., "Intrusion Detection Systems for IoT: opportunities and challenges offered by Edge Computing and Machine Learning", arxiv.org, Cornell University Library, Dec. 2020, 20 pages.

* cited by examiner

600

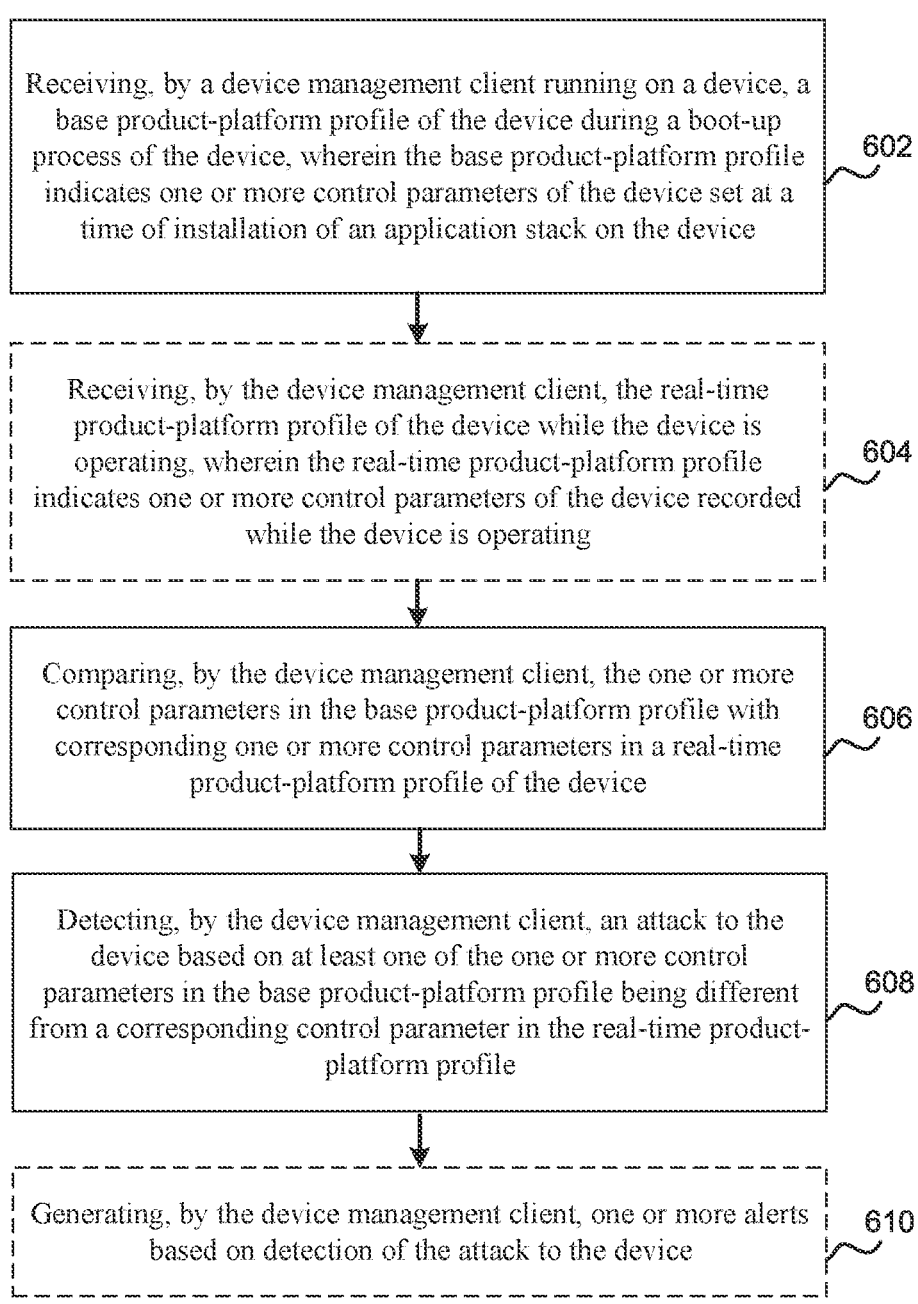

Receiving, by a device management client running on a device, a base product-platform profile of the device during a boot-up process of the device, wherein the base product-platform profile indicates one or more control parameters of the device set at a time of installation of an application stack on the device — 602

Receiving, by the device management client, the real-time product-platform profile of the device while the device is operating, wherein the real-time product-platform profile indicates one or more control parameters of the device recorded while the device is operating — 604

Comparing, by the device management client, the one or more control parameters in the base product-platform profile with corresponding one or more control parameters in a real-time product-platform profile of the device — 606

Detecting, by the device management client, an attack to the device based on at least one of the one or more control parameters in the base product-platform profile being different from a corresponding control parameter in the real-time product-platform profile — 608

Generating, by the device management client, one or more alerts based on detection of the attack to the device — 610

Figure 7:
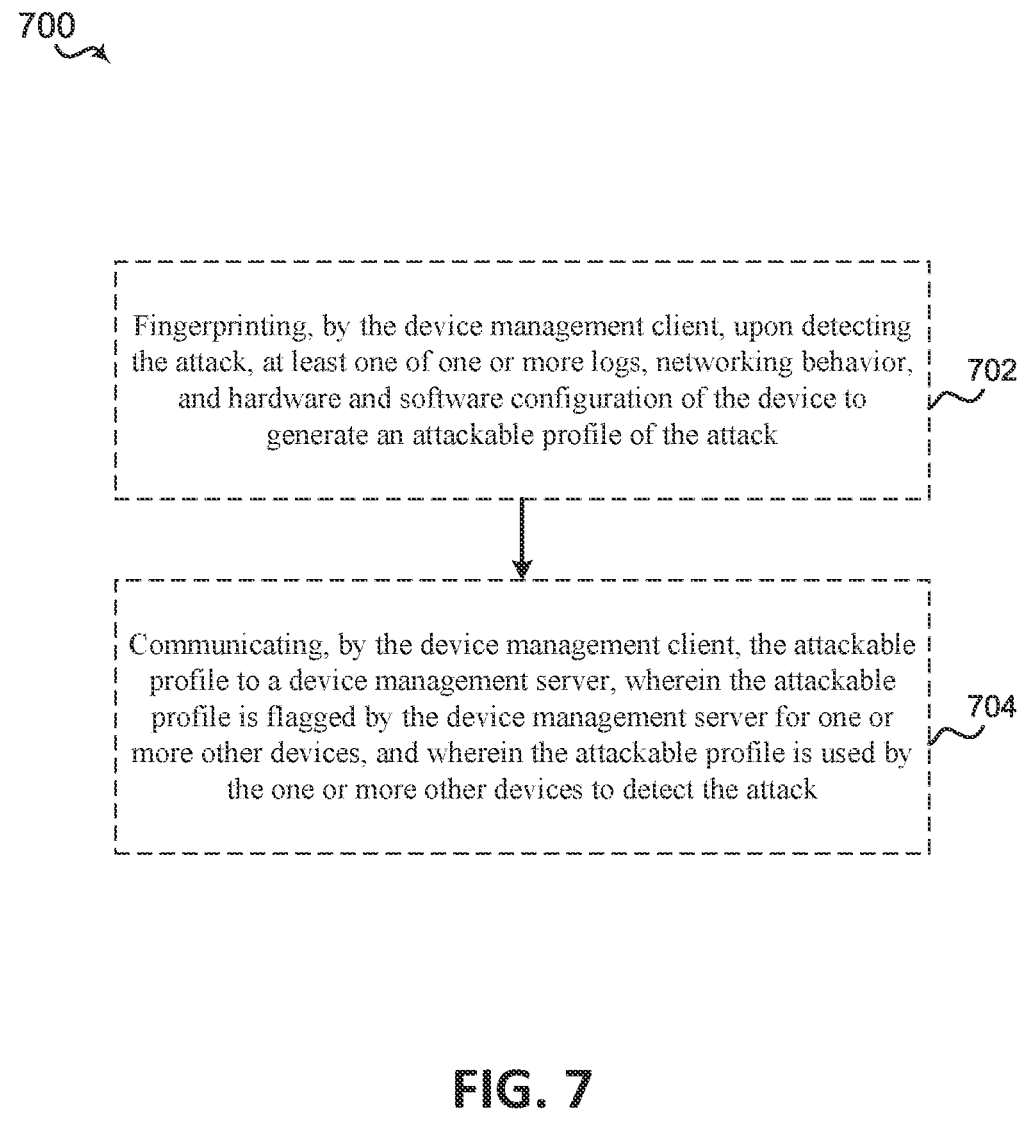

Fingerprinting, by the device management client, upon detecting the attack, at least one of one or more logs, networking behavior, and hardware and software configuration of the device to generate an attackable profile of the attack                                  702

Communicating, by the device management client, the attackable profile to a device management server, wherein the attackable profile is flagged by the device management server for one or more other devices, and wherein the attackable profile is used by the one or more other devices to detect the attack                              704

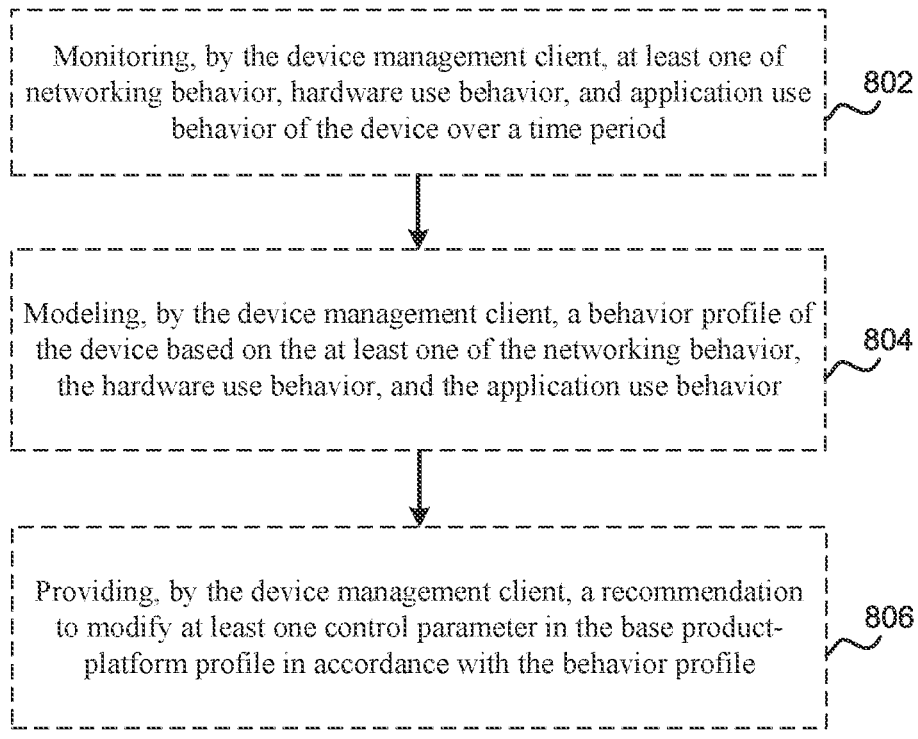

Monitoring, by the device management client, at least one of networking behavior, hardware use behavior, and application use behavior of the device over a time period    802

Modeling, by the device management client, a behavior profile of the device based on the at least one of the networking behavior, the hardware use behavior, and the application use behavior    804

Providing, by the device management client, a recommendation to modify at least one control parameter in the base product-platform profile in accordance with the behavior profile    806

METHOD AND SYSTEM TO ENFORCE SECURITY ON DEVICES USING DEVICE MANAGEMENT LAYER

CROSS REFERENCE TO RELATED APPLICATION(S)

This application claims priority to Indian Provisional Application Serial No. 202321024639, entitled "METHOD AND SYSTEM TO ENFORCE SECURITY ON DEVICES USING DEVICE MANAGEMENT LAYER" and filed on Mar. 31, 2023, which is expressly incorporated by reference herein in the entirety.

BACKGROUND

The present disclosure relates generally to web-enabled devices. More particularly, the present disclosure relates to methods and systems to enforce security on web-enabled devices using device management layer (including a device management client and a device management server).

A building management system (BMS) is, in general, a system of devices configured to control, monitor, and manage equipment in or around a building or building area. A BMS may include a heating, ventilation, or air conditioning (HVAC) system, a security system, a lighting system, a fire alerting system, another system that is capable of managing building functions or devices, or any combination thereof. BMS devices may be installed in any environment (e.g., an indoor area or an outdoor area) and the environment may include any number of buildings, spaces, zones, rooms, or areas.

A BMS may include one or more computer systems (e.g., servers, BMS controllers, etc.) that serve as enterprise level controllers, application or data servers, head nodes, master controllers, or field controllers for the BMS. Such computer systems may communicate with multiple downstream building systems or subsystems (e.g., an HVAC system, a security system, etc.) according to like or disparate protocols (e.g., Local Operating Network (LON), Building Automation and Control Network (BACnet), etc.). The computer systems may also provide one or more human-machine interfaces or client interfaces (e.g., graphical user interfaces (GUIs), reporting interfaces, text-based computer interfaces, client-facing web services, web servers that provide pages to web clients, etc.) for controlling, viewing, or otherwise interacting with the BMS, its subsystems, and devices.

Typically, BMSs are deployed in a building to add an essence of intelligent ability. The BMSs (also referred as building automation systems) employ web-enabled devices (for example, Internet of Things (IoT)-enabled devices, Operational Technology (OT) devices, etc.) to improve processing capabilities. However, the use of web-enabled devices also makes the BMSs vulnerable to cyberattacks, which is undesirable.

In today's building automation ecosystem, Information Technology (IT) infrastructure and OT/IoT-enabled devices coexist in the same premises physically, but OT devices are not mapped or called out clearly in the IT infrastructure. As a result, the IT infrastructure is incapable of keeping track of the BMS devices, and therefore, many a times, attack(s) on the BMS devices fail to get noticed. Additionally, the BMS's devices do not have sophisticated detection mechanisms in place, which makes them a soft target for attackers to attack the building infrastructure or can often be used as pivot systems in large scale attacks.

Further, although BMSs are multi-tier architecture systems and they communicate with each other for managing a building efficiently, they continue to exist in isolation. Therefore, if a security breach happens at one site, other sites with similar setup may also be vulnerable to the security breach. As a result, there are high chances that the security breach may spread to other parts of an organization's infrastructure, which is undesirable.

In light of the foregoing, there exists a need for methods and systems that safeguard web-enabled devices against security breaches.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

One implementation of the present disclosure relates to a method to enforce security on a device. The steps performed by a device management client running on the device to enforce security on the device comprise receiving a base product-platform profile of the device during a boot-up process of the device. The base product-platform profile indicates one or more control parameters of the device set at a time of installation of an application stack on the device. The steps further comprise comparing the one or more control parameters in the base product-platform profile with corresponding one or more control parameters in a real-time product-platform profile of the device. The steps further comprise detecting an attack to the device based on at least one of the one or more control parameters in the base product-platform profile being different from a corresponding control parameter in the real-time product-platform profile.

In some aspects, the steps further comprise receiving, by the device management client, the real-time product-platform profile of the device while the device is operating, wherein the real-time product-platform profile indicates one or more control parameters of the device recorded while the device is operating.

In some aspects, the base product-platform profile is received by the device management client from a trusted execution environment or from a non-trusted execution environment.

In some aspects, the steps further comprise generating, by the device management client, one or more alerts based on detection of the attack to the device.

In some aspects, the steps further comprise fingerprinting, by the device management client, upon detecting the attack, at least one of one or more logs, networking behavior, and hardware and software configuration of the device to generate an attackable profile of the attack.

In some aspects, the steps further comprise communicating, by the device management client, the attackable profile to a device management server, wherein the attackable profile is flagged by the device management server for one or more other web-enabled devices, and wherein the attackable profile is used by the one or more other web-enabled devices to detect the attack.

In some aspects, the communication between the device management client and the device management server is via a secure communication channel that uses at least one of Host Identity Protocol (HIP) or an encrypted communication network.

In some aspects, the device management client is a trusted execution environment application that runs on a secure operating system on the device such that the secure operating system is different from a general purpose operating system of the device.

In some aspects, the secure operating system runs on a first processor that is different from a second processor on which the general purpose operating system runs. Further, the device is a web-enabled device or an Internet-of-Things (IoT) device.

In some aspects, the steps further comprise monitoring, by the device management client, at least one of networking behavior, hardware use behavior, and application use behavior of the device over a time period. The steps further comprise modeling, by the device management client, a behavior profile of the device based on the at least one of the networking behavior, the hardware use behavior, and the application use behavior. The steps further comprise providing, by the device management client, a recommendation to update at least one control parameter in the base product-platform profile in accordance with the behavior profile.

In some aspects, the behavior profile is modelled using an artificial intelligence model.

In some aspects, the attack to the device is further detected by the device management client based on a deviation in at least one of the networking behavior, the hardware use behavior, and the application use behavior from the behavior profile.

In some aspects, the steps further comprise enabling, by the device management client, remote debugging feature on the device for a limited time duration to allow debugging of the device by a remote device using a secure communication channel. The steps further comprise disabling, the device management client, the remote debugging feature on the device after the limited time duration ends.

In some aspects, the base product-platform profile is compared with the real-time product-platform profile by the device management client on each update of the device or on periodic time intervals.

Another implementation of the present disclosure relates to a device comprising one or more memory devices having instructions stored thereon that, when executed by one or more processors, individually or in combination, cause the one or more processors to run a device management client. The device management client is configured to receive a base product-platform profile of the device during a boot-up process of the device. The base product-platform profile indicates one or more control parameters of the device set at a time of installation of an application stack on the device. The device management client is further configured to compare the one or more control parameters in the base product-platform profile with corresponding one or more control parameters in a real-time product-platform profile of the device. The device management client is further configured to detect an attack to the device based on at least one of the one or more control parameters in the base product-platform profile being different from a corresponding control parameter in the real-time product-platform profile.

In some aspects, the device management client is configured to communicate with a device management server via a secure communication channel that uses at least one of Host Identity Protocol (HIP) or an encrypted communication network.

Another example aspect includes an apparatus comprising one or more memories storing instructions, and one or more processors coupled with the one or more memories. The one or more processors, individually or in combination, are configured to execute the instructions to run a device management client. The device management client is configured to receive a base product-platform profile of the device during a boot-up process of the device, wherein the base product-platform profile indicates one or more control parameters of the device set at a time of installation of an application stack on the device. The device management client is further configured to compare the one or more control parameters in the base product-platform profile with corresponding one or more control parameters in a real-time product-platform profile of the device. The device management client is further configured to detect an attack to the device based on at least one of the one or more control parameters in the base product-platform profile being different from a corresponding control parameter in the real-time product-platform profile.

Another example aspect includes an apparatus comprising means for receiving, by a device management client running on a device, a base product-platform profile of the device during a boot-up process of the device, wherein the base product-platform profile indicates one or more control parameters of the device set at a time of installation of an application stack on the device. The apparatus further comprises means for comparing, by the device management client, the one or more control parameters in the base product-platform profile with corresponding one or more control parameters in a real-time product-platform profile of the device. The apparatus further comprises means for detecting, by the device management client, an attack to the device based on at least one of the one or more control parameters in the base product-platform profile being different from a corresponding control parameter in the real-time product-platform profile.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

Various objects, aspects, features, and advantages of the disclosure will become more apparent and better understood by referring to the detailed description taken in conjunction with the accompanying drawings, in which like reference characters identify corresponding elements throughout. In the drawings, like reference numbers generally indicate identical, functionally similar, and/or structurally similar elements, and dashed lines may indicate optional elements. The appended drawings are provided to illustrate and not to limit the disclosed aspects, and in which:

FIG. 6 is a flowchart of an example method to enforce security on a device/system using device management layer, according to an example aspect of the present disclosure;

FIG. 7 is a flowchart of an example method to enforce security upon detecting an attack, according to an example aspect of the present disclosure;

FIG. 8 is a flowchart of a method to enforce security based on monitoring device behavior, according to an example aspect of the present disclosure.

DETAILED DESCRIPTION

Figure 1:
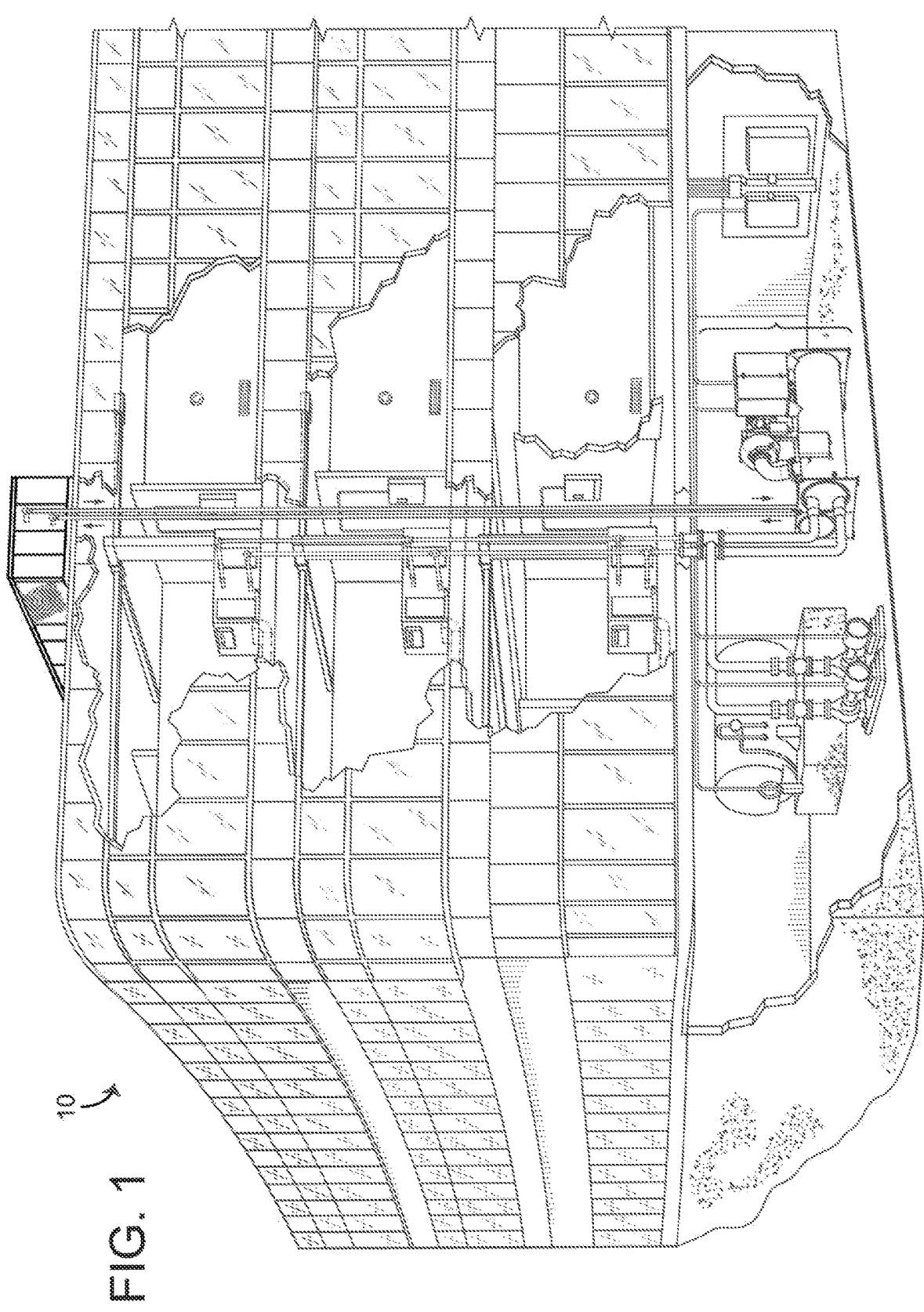
FIG. 1 is a drawing of a perspective view of a building equipped with a building management system (BMS), according to an example aspect of the present disclosure.

Various aspects are now described with reference to the drawings. In the following description, for purposes of explanation, numerous specific details are set forth in order to provide a thorough understanding of one or more aspects. It may be evident, however, that such aspects may be practiced without these specific details.

Hardware platform providers have worked hard to provide a secure and isolated environment as a root of trust. Such a secure environment (e.g., TrustZone in ARM) has its own secure storage, secure processor, and other resources which are separate from main or primary processor. A secure operating system (OS) runs on a secure processor in a high privilege mode, frequently known as trusted execution environment (TEE) that provides a root of trust when booting a device. During the boot process, TEE is considered as the root of trust as TEE loads a primary OS, but once the device is up and running, the control is with the primary OS only and TEE does not play much of a role.

The emphasis of TEE platform and other available solutions is on prevention of attacks, but to detect an attack may be equally important. Once the device is under attack, it is desirable to detect the attack as early as possible and prevent the attack from spreading further in the device and the network to which the device is connected. When a device is under attack, the attacker may try to utilize some unutilized resources or access hardware resources from an unauthorized user. The present disclosure provides various aspects of systems and methods to dynamically detect or otherwise monitor whether a device is under attack using device management layer (including a device management client and a device management server).

Typically, a device management client runs on the primary OS and handles various operations such as resource allocation, monitoring device health, pushing updates, or the like. However, in the present disclosure, the device management client is implemented as a TEE application that runs on the secure OS, instead of the general purpose OS, and that along with handling other conventional operations, also enforces security policies throughout the lifetime of the device. When the device undergoes secure boot, the secure OS loads the general purpose OS in a TEE. Further, during the boot, the secure OS provides a base product-platform profile of the device stored in a secure storage to the device management client. The base product-platform profile indicates one or more control parameters of the device that were set at the time of installation of an application stack on the device (for example, during factory provisioning). For example, during the installation of the application stack, certain control parameters may be set to enable the functioning of the device as per the requirement. Once the secure boot is complete and the primary OS is up and running, the device starts operating. During the operation of the device, the device management client receives a real-time product-platform profile of the device from a non-trusted execution environment, for example, the general purpose OS. The real-time product-platform profile may indicate control parameters of the device that were recorded while the device is operating. The device management client then compares the control parameters in the base product-platform profile with the corresponding control parameters in the real-time product-platform profile. If, based on the comparison, the device management client identifies that at least one of the control parameters in the base product-platform profile is different from a corresponding control parameter in the real-time product-platform profile, the device management client detects that the device is under attack. Upon detecting the attack, the device management client performs various actions to recover from the attack. For example, the device management client generates alerts for users to indicate the attack. The device management client further generates an attackable profile by fingerprinting one or more logs, networking behavior, and hardware and software configuration of the device, and communicates the attackable profile to a device management server over a secure communication channel, so that the device management server may flag the attackable profile for other devices for remediation. Therefore, by operating the device management client as a TEE application, the present aspects utilize the device management layer (including a device management client and a device management server) for detection and prevention of attacks to web-enabled devices/systems.

It should be understood that the present disclosure is not limited to the details or methodology set forth in the description or illustrated in the figures. It should also be understood that the terminology is for the purpose of description only and should not be regarded as limiting.

Methods and systems for enforcing security on devices using device management layer (including a device management client and a device management server) are described herein. The devices may include web-enabled devices/systems utilized in a plurality of building automation or management systems, subsystems, or as a part of a high level building automation system.

Building and Building Management System

Referring to FIG. 1, a drawing of a perspective view of a building 10 equipped with a building management system (BMS) is shown, according to an example aspect. The BMS serves building 10. The BMS for building 10 may include any number or type of devices that serve building 10. For example, each floor may include one or more security devices, video surveillance cameras, fire detectors, smoke detectors, lighting systems, HVAC systems, or other building systems or devices. In modern BMSs, BMS devices may exist on different networks within the building (e.g., one or more wireless networks, one or more wired networks, etc.) and yet serve the same building space or control loop. For example, BMS devices may be connected to different communications networks or field controllers even if the devices serve the same area (e.g., floor, conference room, building zone, tenant area, etc.) or purpose (e.g., security, ventilation, cooling, heating, etc.).

BMS devices may collectively or individually be referred to as building equipment. Building equipment may include any number or type of BMS devices within or around building 10. For example, building equipment may include controllers, chillers, rooftop units, fire and security systems, elevator systems, thermostats, lighting, serviceable equipment (e.g., vending machines), and/or any other type of equipment that may be used to control, automate, or otherwise contribute to an environment, state, or condition of building 10. The terms "BMS devices," "BMS device," and "building equipment" are used interchangeably throughout this disclosure.

Figure 2:
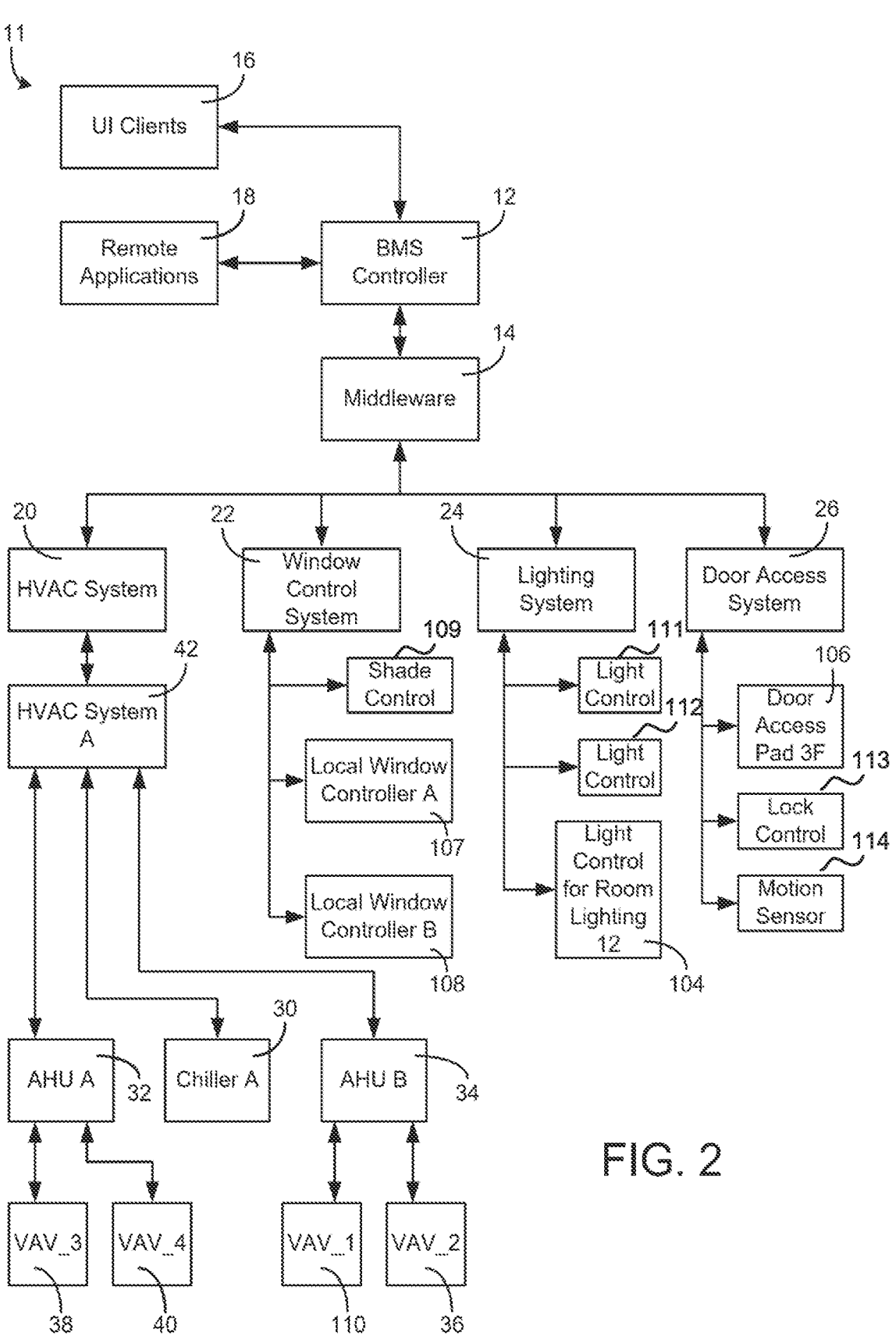
FIG. 2 is a block diagram of a BMS that serves the building of FIG. 1, according to an example aspect of the present disclosure.

Referring to FIG. 2, a block diagram of a BMS 11 that serves the building 10 is shown, according to an example aspect. BMS 11 is shown to include a plurality of BMS subsystems 20, 22, 24, 26. Each BMS subsystem 20, 22, 24, 26 is connected to a plurality of BMS devices and makes data points for varying connected devices available to upstream BMS controller 12. Additionally, BMS subsystems 20, 22, 24, 26 may encompass other lower-level subsystems. For example, an HVAC system may be broken down further as "HVAC system A," "HVAC system B," etc. In some buildings, multiple HVAC systems or subsystems may exist in parallel and may not be a part of the same HVAC system 20.

As shown in FIG. 2, BMS 11 may include an HVAC system 20. HVAC system 20 may control HVAC operations in building 10. HVAC system 20 is shown to include a lower-level HVAC system 42 (named "HVAC system A"). HVAC system 42 may control HVAC operations for a specific floor or zone of building 10. HVAC system 42 may be connected to air handling units (AHUs) 32, 34 (named "AHU A" and "AHU B," respectively, in BMS 11). AHU 32 may serve variable air volume (VAV) boxes 38, 40 (named "VAV_3" and "VAV_4" in BMS 11). Likewise, AHU 34 may serve VAV boxes 36 and 110 (named "VAV_2" and "VAV_1"). HVAC system 42 may also include chiller 30 (named "Chiller A" in BMS 11). Chiller 30 may provide chilled fluid to AHU 32 and/or to AHU 34. HVAC system 42 may receive data (i.e., BMS inputs such as temperature sensor readings, damper positions, temperature setpoints, etc.) from AHUs 32, 34. HVAC system 42 may provide such BMS inputs to HVAC system 20 and, via middleware 14, to BMS controller 12. Similarly, other BMS subsystems may receive inputs from other building devices or objects and provide the received inputs to BMS controller 12 (e.g., via middleware 14).

Middleware 14 may include services that allow interoperable communication to, from, or between disparate BMS subsystems 20, 22, 24, 26 of BMS 11 (e.g., HVAC systems from different manufacturers, HVAC systems that communicate according to different protocols, security/fire systems, IT resources, door access systems, etc.). Middleware 14 may be, for example, an EnNet server sold by Johnson Controls, Inc. While middleware 14 is shown as separate from BMS controller 12, middleware 14 and BMS controller 12 may be integrated in some aspects. For example, middleware 14 may be a part of BMS controller 12.

Still referring to FIG. 2, window control system 22 may receive shade control information from one or more shade controls 109, ambient light level information from one or more light sensors, and/or other BMS inputs (e.g., sensor information, setpoint information, current state information, etc.) from downstream devices. Window control system 22 may include window controllers 107, 108 (e.g., named "local window controller A" and "local window controller B," respectively, in BMS 11). Window controllers 107, 108 control the operation of subsets of window control system 22. For example, window controller 108 may control window blind or shade operations for a given room, floor, or building in the BMS 11.

Lighting system 24 may receive lighting related information from a plurality of downstream light controls 111, 112, 104 (e.g., from room lighting 104). Door access system 26 may receive lock control 113, motion 114, state, or other door related information from a plurality of downstream door controls. Door access system 26 is shown to include door access pad 106 (named "Door Access Pad 3F"), which may grant or deny access to a building space (e.g., a floor, a conference room, an office, etc.) based on whether valid user credentials are scanned or entered (e.g., via a keypad, via a badge-scanning pad, etc.).

BMS subsystems 20, 22, 24, 26 may be connected to BMS controller 12 via middleware 14 and may be configured to provide BMS controller 12 with BMS inputs from various BMS subsystems 20, 22, 24, 26 and their varying downstream devices. BMS controller 12 may be configured to make differences in building subsystems transparent at the human-machine interface or client interface level (e.g., for connected or hosted user interface (UI) clients 16, remote applications 18, etc.). BMS controller 12 may be configured to describe or model different building devices and building subsystems using common or unified objects (e.g., software objects stored in memory) to help provide the transparency. Software equipment objects may allow developers to write applications capable of monitoring and/or controlling various types of building equipment regardless of equipment-specific variations (e.g., equipment model, equipment manufacturer, equipment version, etc.). Software building objects may allow developers to write applications capable of monitoring and/or controlling building zones on a zone-by-zone level regardless of the building subsystem makeup.

Figure 3:
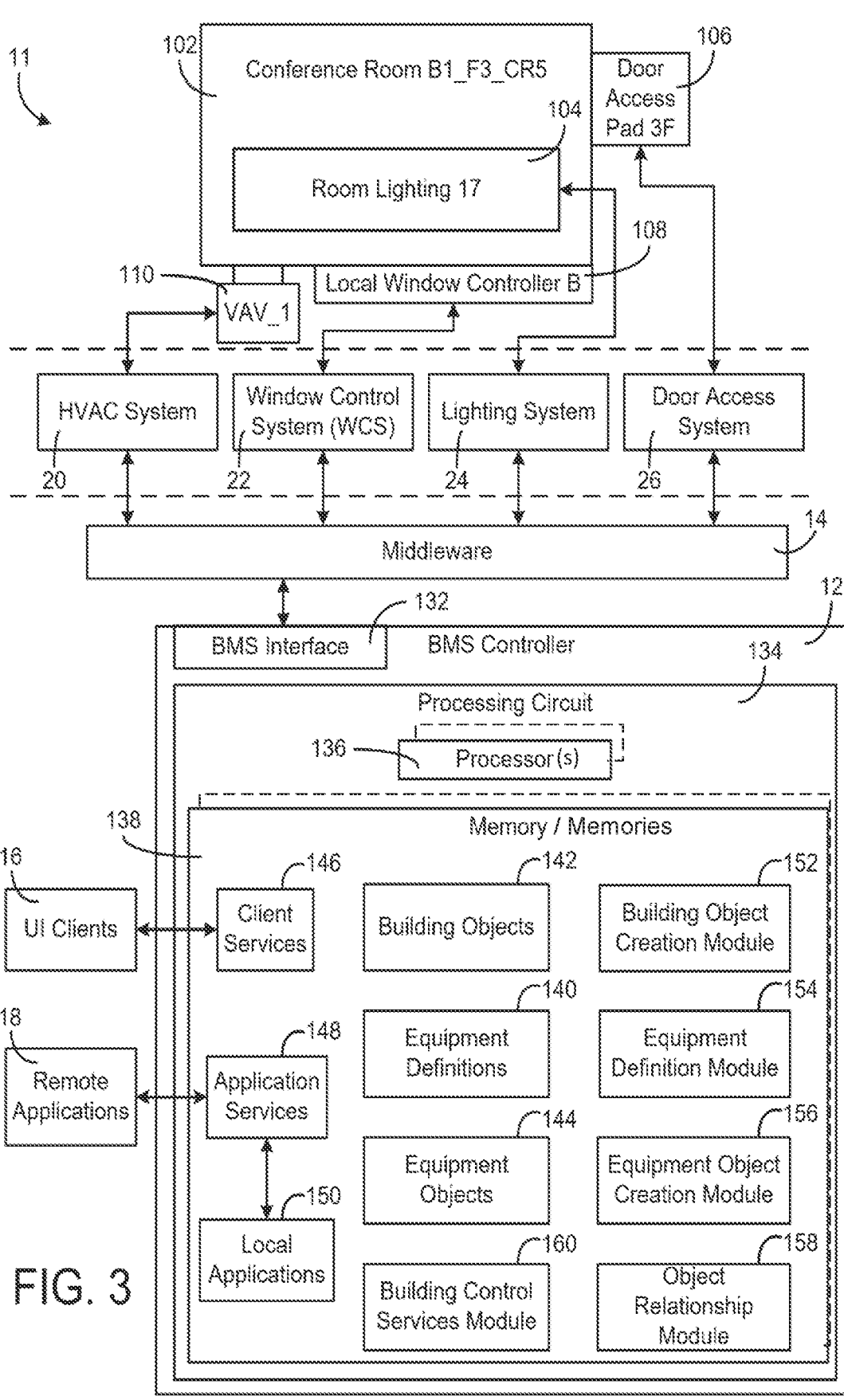
FIG. 3 is a block diagram illustrating a portion (for example, a BMS controller) of the BMS of FIG. 2 that serves the building of FIG. 1, according to an example aspect of the present disclosure.

Referring to FIG. 3, a block diagram illustrating a portion (for example, a BMS controller) of BMS 11 that serves building 10 in greater detail is shown, according to an example aspect. Particularly, FIG. 3 illustrates a portion of BMS 11 that services a conference room 102 of building 10 (named "B1_F3_CR5"). Conference room 102 may be affected by many different building devices connected to many different BMS subsystems. For example, conference room 102 includes or is otherwise affected by VAV box 110, window controller 108 (e.g., a blind controller), a system of lights 104 (named "Room Lighting 17"), and a door access pad 106.

Each of the building devices shown at the top of FIG. 3 may include local control circuitry configured to provide signals to their supervisory controllers or more generally to the BMS subsystems 20, 22, 24, 26. The local control circuitry of the building devices shown at the top of FIG. 3 may also be configured to receive and respond to control signals, commands, setpoints, or other data from their supervisory controllers. For example, the local control circuitry of VAV box 110 may include circuitry that affects an actuator in response to control signals received from a field controller that is a part of HVAC system 20. Window controller 108 may include circuitry that affects windows or blinds in response to control signals received from a field controller that is part of window control system 22. Room lighting 104 may include circuitry that affects the lighting in response to control signals received from a field controller that is part of lighting system 24. Access pad 106 may include circuitry that affects door access (e.g., locking or unlocking one or more doors) in response to control signals received from a field controller that is part of door access system 26.

Still referring to FIG. 3, BMS controller 12 is shown to include a BMS interface 132 in communication with middleware 14. In some aspects, BMS interface 132 is a communications interface. For example, BMS interface 132 may include wired or wireless interfaces (e.g., jacks, antennas, transmitters, receivers, transceivers, wire terminals, etc.) for conducting data communications with various systems, devices, or networks. In some aspects, for example, BMS interface 132 may include an Ethernet card and port for sending and receiving data via an Ethernet-based communications network. In some alternative or additional example aspects, BMS interface 132 may include a Wi-Fi transceiver for communicating via a wireless communications network. BMS interface 132 may be configured to communicate via local area networks (LANs) or wide area networks (WANs, e.g., the Internet, a building WAN, etc.).

In some aspects, BMS interface 132 and/or middleware 14 include an application gateway configured to receive input from applications running on client devices. For example, BMS interface 132 and/or middleware 14 may include one or more wireless transceivers (e.g., a wireless fidelity (Wi-Fi) transceiver, a Bluetooth transceiver, an near field communication (NFC) transceiver, a cellular transceiver, etc.) for communicating with client devices. BMS interface 132 may be configured to receive building management inputs from middleware 14 or directly from one or more BMS subsystems 20, 22, 24, 26. BMS interface 132 and/or middleware 14 may include any number of software buffers, queues, listeners, filters, translators, or other communications-supporting services.

Still referring to FIG. 3, BMS controller 12 is shown to include a processing circuit 134 including one or more processors 136 and one or more memories 138.

As used herein, a processor, at least one processor, and/or one or more processors, individually or in combination, configured to perform or operable for performing a plurality of actions is meant to include at least two different processors able to perform different, overlapping or non-overlapping subsets of the plurality actions, or a single processor able to perform all of the plurality of actions. In one non-limiting example of multiple processors being able to perform different ones of the plurality of actions in combination, a description of a processor, at least one processor, and/or one or more processors configured or operable to perform actions X, Y, and Z may include at least a first processor configured or operable to perform a first subset of X, Y, and Z (e.g., to perform X) and at least a second processor configured or operable to perform a second subset of X, Y, and Z (e.g., to perform Y and Z). Alternatively, a first processor, a second processor, and a third processor may be respectively configured or operable to perform a respective one of actions X, Y, and Z. It should be understood that any combination of one or more processors each may be configured or operable to perform any one or any combination of a plurality of actions.

As used herein, a memory, at least one memory, and/or one or more memories, individually or in combination, configured to store or having stored thereon instructions executable by one or more processors for performing a plurality of actions is meant to include at least two different memories able to store different, overlapping or non-overlapping subsets of the instructions for performing different, overlapping or non-overlapping subsets of the plurality actions, or a single memory able to store the instructions for performing all of the plurality of actions. In one non-limiting example of one or more memories, individually or in combination, being able to store different subsets of the instructions for performing different ones of the plurality of actions, a description of a memory, at least one memory, and/or one or more memories configured or operable to store or having stored thereon instructions for performing actions X, Y, and Z may include at least a first memory configured or operable to store or having stored thereon a first subset of instructions for performing a first subset of X, Y, and Z (e.g., instructions to perform X) and at least a second memory configured or operable to store or having stored thereon a second subset of instructions for performing a second subset of X, Y, and Z (e.g., instructions to perform Y and Z). Alternatively, a first memory, and second memory, and a third memory may be respectively configured to store or have stored thereon a respective one of a first subset of instructions for performing X, a second subset of instruction for performing Y, and a third subset of instructions for performing Z. It should be understood that any combination of one or more memories each may be configured or operable to store or have stored thereon any one or any combination of instructions executable by one or more processors to perform any one or any combination of a plurality of actions. Moreover, one or more processors may each be coupled to at least one of the one or more memories and configured or operable to execute the instructions to perform the plurality of actions. For instance, in the above non-limiting example of the different subset of instructions for performing actions X, Y, and Z, a first processor may be coupled to a first memory storing instructions for performing action X, and at least a second processor may be coupled to at least a second memory storing instructions for performing actions Y and Z, and the first processor and the second processor may, In combination, execute the respective subset of instructions to accomplish performing actions X, Y, and Z. Alternatively, three processors may access one of three different memories each storing one of instructions for performing X, Y, or Z, and the three processor may in combination execute the respective subset of instruction to accomplish performing actions X, Y, and Z. Alternatively, a single processor may execute the instructions stored on a single memory, or distributed across multiple memories, to accomplish performing actions X, Y, and Z.

The one or more processors 136 may include a general purpose or specific purpose processor, an application specific integrated circuit (ASIC), one or more field programmable gate arrays (FPGAs), a group of processing components, or other suitable processing components. The one or more processors 136, individually or in combination, are configured to execute computer code or instructions stored in the one or more memories 138 or received from other computer readable media (e.g., compact disc (CD) read-only memory (CDROM), network storage, a remote server, etc.).

The one or more memories 138 may include one or more devices (e.g., memory units, memory devices, storage devices, etc.) for storing data and/or computer code for completing and/or facilitating the various processes described in the present disclosure. The one or more memories 138 may include random access memory (RAM), read-only memory (ROM), hard drive storage, temporary storage, non-volatile memory, flash memory, optical memory, or any other suitable memory for storing software objects and/or computer instructions. The one or more memories 138 may include database components, object code components, script components, or any other type of information structure for supporting the various activities and information structures described in the present disclosure. The one or more memories 138 may be communicably connected to the one or more processors 136 via processing circuit 134 and may include computer code for executing (e.g., by the one or more processors 136, individually or in combination) one or more processes described herein. When the one or more processors 136, individually or in combination, execute instructions stored in the one or more memories 138 for completing the various activities described herein, the one or more processors 136, individually or in combination, generally configure BMS controller 12 (and more particularly processing circuit 134) to complete such activities.

Still referring to FIG. 3, the one or more memories 138, individually or in combination, Ire shown to include building objects 142. In some aspects, BMS controller 12 uses building objects 142 to group otherwise ungrouped or unassociated devices so that the group may be addressed or handled by applications together and in a consistent manner (e.g., a single UI for controlling all of the BMS devices that affect a particular building zone or room). Building objects 142 may apply to spaces of any granularity. For example, a building object may represent an entire building, a floor of a building, or individual rooms on each floor. In some aspects, BMS controller 12 creates and/or stores a building object in the one or more memories 138 for each zone or room of building 10. Building objects 142 may be accessed by UI clients 16 and remote applications 18 to provide a comprehensive UI for controlling and/or viewing information for a particular building zone. Building objects 142 may be created by building object creation module 152 and associated with equipment objects by object relationship module 158, described in greater detail below.

Still referring to FIG. 3, the one or more memories 138, individually or in combination, are shown to include equipment definitions 140. Equipment definitions 140 store the equipment definitions for various types of building equipment. Each equipment definition may apply to building equipment of a different type. For example, equipment definitions 140 may include different equipment definitions for variable air volume modular assemblies (VMAs), fan coil units, AHUs, lighting fixtures, water pumps, and/or other types of building equipment.

Equipment definitions 140 define the types of data points that are generally associated with various types of building equipment. For example, an equipment definition for VMA may specify data point types such as room temperature, damper position, supply air flow, and/or other types of data measured or used by the VMA. Equipment definitions 140 allow for the abstraction (e.g., generalization, normalization, broadening, etc.) of equipment data from a specific BMS device so that the equipment data may be applied to a room or space.

Each of equipment definitions 140 may include one or more point definitions. Each point definition may define a data point of a particular type and may include search criteria for automatically discovering and/or identifying data points that satisfy the point definition. An equipment definition may be applied to multiple pieces of building equipment of the same general type (e.g., multiple different VMA controllers). When an equipment definition is applied to a BMS device, the search criteria specified by the point definitions may be used to automatically identify data points provided by the BMS device that satisfy each point definition.

In some aspects, equipment definitions 140 define data point types as generalized types of data without regard to the model, manufacturer, vendor, or other differences between building equipment of the same general type. The generalized data points defined by equipment definitions 140 allow each equipment definition to be referenced by or applied to multiple different variants of the same type of building equipment.

In some aspects, equipment definitions 140 facilitate the presentation of data points in a consistent and user-friendly manner. For example, each equipment definition may define one or more data points that are displayed via a UI. The displayed data points may be a subset of the data points defined by the equipment definition.

In some aspects, equipment definitions 140 specify a system type (e.g., HVAC, lighting, security, fire, etc.), a system sub-type (e.g., terminal units, air handlers, central plants, etc.), and/or data category (e.g., critical, diagnostic, operational, etc.) associated with the building equipment defined by each equipment definition. Specifying such attributes of building equipment at the equipment definition level allows the attributes to be applied to the building equipment along with the equipment definition when the building equipment is initially defined. Building equipment may be filtered by various attributes provided in the equipment definition to facilitate the reporting and management of equipment data from multiple building systems.

Equipment definitions 140 may be automatically created by abstracting the data points provided by archetypal controllers (e.g., typical or representative controllers) for various types of building equipment. In some aspects, equipment definitions 140 are created by equipment definition module 154, described in greater detail below.

Still referring to FIG. 3, the one or more memories 138, individually or in combination, are shown to further include equipment objects 144. Equipment objects 144 may be software objects that define a mapping between a data point type (e.g., supply air temperature, room temperature, damper position, etc.) and an actual data point (e.g., a measured or calculated value for the corresponding data point type) for various pieces of building equipment. Equipment objects 144 may facilitate the presentation of equipment-specific data points in an intuitive and user-friendly manner by associating each data point with an attribute identifying the corresponding data point type. The mapping provided by equipment objects 144 may be used to associate a particular data value measured or calculated by BMS 11 with an attribute that may be displayed via a UI.

Equipment objects 144 may be created (e.g., by equipment object creation module 156) by referencing equipment definitions 140. For example, an equipment object may be created by applying an equipment definition to the data points provided by a BMS device. The search criteria included in an equipment definition may be used to identify data points of the building equipment that satisfy the point definitions. A data point that satisfies a point definition may be mapped to an attribute of the equipment object corresponding to the point definition.

Each equipment object may include one or more attributes defined by the point definitions of the equipment definition used to create the equipment object. For example, an equipment definition which defines the attributes "Occupied Command," "Room Temperature," and "Damper Position" may result in an equipment object being created with the same attributes. The search criteria provided by the equipment definition are used to identify and map data points associated with a particular BMS device to the attributes of the equipment object. The creation of equipment objects is described in greater detail below with reference to equipment object creation module 156.

Equipment objects 144 may be related with each other and/or with building objects 142. Causal relationships may be established between equipment objects to link equipment objects to each other. For example, a causal relationship may be established between a VMA and an AHU which provides airflow to the VMA. Causal relationships may also be established between equipment objects 144 and building objects 142. For example, equipment objects 144 may be associated with building objects 142 representing particular rooms or zones to indicate that the equipment object serves that room or zone. Relationships between objects are described in greater detail below with reference to object relationship module 158.

Still referring to FIG. 3, the one or more memories 138, individually or in combination, are shown to include client services 146 and application services 148. Client services 146 may be configured to facilitate interaction and/or communication between BMS controller 12 and various internal or external clients or applications. For example, client services 146 may include web services or application programming interfaces (APIs) available for communication with UI clients 16 and remote applications 18 (e.g., applications running on a mobile device, energy monitoring applications, applications allowing a user to monitor the performance of the BMS 11, automated fault detection and diagnostics systems, etc.). Application services 148 may facilitate direct or indirect communications between remote applications 18, local applications 150, and BMS controller 12. For example, application services 148 may allow BMS controller 12 to communicate (e.g., over a communications network) with remote applications 18 running on mobile devices and/or with other BMS controllers.

In some aspects, application services 148 facilitate an applications gateway for conducting electronic data communications with UI clients 16 and/or remote applications 18. For example, application services 148 may be configured to receive communications from mobile devices and/or BMS devices. Client services 146 may provide client devices with a GUI that consumes data points and/or display data defined by equipment definitions 140 and mapped by equipment objects 144.

Still referring to FIG. 3, the one or more memories 138, individually or in combination, are shown to further include a building object creation module 152. Building object creation module 152 may be configured to create one or more building objects stored in building objects 142. Building object creation module 152 may create a software building object for various spaces within building 10. Building object creation module 152 may create a building object for a space of any size or granularity. For example, building object creation module 152 may create a building object representing an entire building, a floor of a building, or individual rooms on each floor. In some aspects, building object creation module 152 creates and/or stores a building object in the one or more memories 138 for each zone or room of building 10.

The building objects created by building object creation module 152 may be accessed by UI clients 16 and/or remote applications 18 to provide a comprehensive UI for controlling and/or viewing information for a particular building zone. Building objects 142 may group otherwise ungrouped or unassociated devices so that the group may be addressed or handled by applications together and in a consistent manner (e.g., a single UI for controlling all of the BMS devices that affect a particular building zone or room). In some aspects, building object creation module 152 uses the systems and methods described in U.S. patent application Ser. No. 12/887,390, filed Sep. 21, 2010, for creating software-defined building objects.

In some aspects, building object creation module 152 provides a UI for guiding a user through a process of creating building objects. For example, building object creation module 152 may provide a UI to client devices (e.g., via client services 146) that allows a new space to be defined. In some aspects, building object creation module 152 defines spaces hierarchically. For example, the UI for creating building objects may prompt a user to create a space for a building, for floors within the building, and/or for rooms or zones within each floor.

In some aspects, building object creation module 152 creates building objects automatically or semi-automatically. For example, building object creation module 152 may automatically define and create building objects using data imported from another data source (e.g., user view folders, a table, a spreadsheet, etc.). In some aspects, building object creation module 152 references an existing hierarchy for BMS 11 to define the spaces within building 10. For example, BMS 11 may provide a listing of controllers for building 10 (e.g., as part of a network of data points) that have the physical location (e.g., room name) of the controller in the name of the controller itself. Building object creation module 152 may extract room names from the names of BMS controllers defined in the network of data points and create building objects for each extracted room. Building objects may be stored in building objects 142.

Still referring to FIG. 3, the one or more memories 138, individually or in combination, are shown to further include an equipment definition module 154. Equipment definition module 154 may be configured to create equipment definitions for various types of building equipment and to store one or more equipment definitions in equipment definitions 140. In some aspects, equipment definition module 154 creates equipment definitions by abstracting the data points provided by archetypal controllers (e.g., typical or representative controllers) for various types of building equipment. For example, equipment definition module 154 may receive a user selection of an archetypal controller via a UI. The archetypal controller may be specified as a user input or selected automatically by equipment definition module 154. In some aspects, equipment definition module 154 selects an archetypal controller for building equipment associated with a terminal unit such as a VMA.

Equipment definition module 154 may identify one or more data points associated with the archetypal controller. Identifying one or more data points associated with the archetypal controller may include accessing a network of data points provided by BMS 11. The network of data points may be a hierarchical representation of data points that are measured, calculated, or otherwise obtained by various BMS devices. BMS devices may be represented in the network of data points as nodes of the hierarchical representation with associated data points depending from each BMS device. Equipment definition module 154 may find the node corresponding to the archetypal controller in the network of data points and identify one or more data points which depend from the archetypal controller node.

Equipment definition module 154 may generate a point definition for each identified data point of the archetypal controller. Each point definition may include an abstraction of the corresponding data point that is applicable to multiple different controllers for the same type of building equipment. For example, an archetypal controller for a particular VMA (i.e., "VMA-20") may be associated with an equipment-specific data point such as "VMA-20. DPR-POS" (i.e., the damper position of VMA-20) and/or "VMA-20. SUP-FLOW" (i.e., the supply air flow rate through VMA-20). Equipment definition module 154 abstracts the equipment-specific data points to generate abstracted data point types that are generally applicable to other equipment of the same type. For example, equipment definition module 154 may abstract the equipment-specific data point "VMA-20. DPR-POS" to generate the abstracted data point type "DPR-POS" and may abstract the equipment-specific data point "VMA-20. SUP-FLOW" to generate the abstracted data point type "SUP-FLOW." In some aspects, the abstracted data point types generated by equipment definition module 154 may be applied to multiple different variants of the same type of building equipment (e.g., VMAs from different manufacturers, VMAs having different models or output data formats, etc.).

In some aspects, equipment definition module 154 generates a user-friendly label for each point definition. The user-friendly label may be a plain text description of the variable defined by the point definition. For example, equipment definition module 154 may generate the label "Supply Air Flow" for the point definition corresponding to the abstracted data point type "SUP-FLOW" to indicate that the data point represents a supply air flow rate through the VMA. The labels generated by equipment definition module 154 may be displayed in conjunction with data values from BMS devices as part of a user-friendly interface.

In some aspects, equipment definition module 154 generates search criteria for each point definition. The search criteria may include one or more parameters for identifying another data point (e.g., a data point associated with another controller of BMS 11 for the same type of building equipment) that represents the same variable as the point definition. Search criteria may include, for example, an instance number of the data point, a network address of the data point, and/or a network point type of the data point.

In some aspects, search criteria include a text string abstracted from a data point associated with the archetypal controller. For example, equipment definition module 154 may generate the abstracted text string "SUP-FLOW" from the equipment-specific data point "VMA-20. SUP-FLOW." In some aspects, the abstracted text string matches other equipment-specific data points corresponding to the supply air flow rates of other BMS devices (e.g., "VMA-18. SUP-FLOW," "SUP-FLOW.VMA-01," etc.). Equipment definition module 154 may store a name, label, and/or search criteria for each point definition in memory 138.

Equipment definition module 154 may use the generated point definitions to create an equipment definition for a particular type of building equipment (e.g., the same type of building equipment associated with the archetypal controller). The equipment definition may include one or more of the generated point definitions. Each point definition defines a potential attribute of BMS devices of the particular type and provides search criteria for identifying the attribute among other data points provided by such BMS devices.

In some aspects, the equipment definition created by equipment definition module 154 includes an indication of display data for BMS devices that reference the equipment definition. Display data may define one or more data points of the BMS device that will be displayed via a UI. In some aspects, display data are user defined. For example, equipment definition module 154 may prompt a user to select one or more of the point definitions included in the equipment definition to be represented in the display data. Display data may include the user-friendly label (e.g., "Damper Position") and/or short name (e.g., "DPR-POS") associated with the selected point definitions.

In some aspects, equipment definition module 154 provides a visualization of the equipment definition via a GUI. The visualization of the equipment definition may include a point definition portion which displays the generated point definitions, a user input portion configured to receive a user selection of one or more of the point definitions displayed in the point definition portion, and/or a display data portion which includes an indication of an abstracted data point corresponding to each of the point definitions selected via the user input portion. The visualization of the equipment definition may be used to add, remove, or change point definitions and/or display data associated with the equipment definitions.

Equipment definition module 154 may generate an equipment definition for each different type of building equipment in BMS 11 (e.g., VMAs, chillers, AHUs, etc.). Equipment definition module 154 may store the equipment definitions in a data storage device (e.g., the one or more memories 138, equipment definitions 140, an external or remote data storage device, etc.).

Still referring to FIG. 3, the one or more memories 138, individually or in combination, are shown to further include an equipment object creation module 156. Equipment object creation module 156 may be configured to create equipment objects for various BMS devices. In some aspects, equipment object creation module 156 creates an equipment object by applying an equipment definition to the data points provided by a BMS device. For example, equipment object creation module 156 may receive an equipment definition created by equipment definition module 154. Receiving an equipment definition may include loading or retrieving the equipment definition from a data storage device.

In some aspects, equipment object creation module 156 determines which of a plurality of equipment definitions to retrieve based on the type of BMS device used to create the equipment object. For example, if the BMS device is a VMA, equipment object creation module 156 may retrieve the equipment definition for VMAs; whereas if the BMS device is a chiller, equipment object creation module 156 may retrieve the equipment definition for chillers. The type of BMS device to which an equipment definition applies may be stored as an attribute of the equipment definition. Equipment object creation module 156 may identify the type of BMS device being used to create the equipment object and retrieve the corresponding equipment definition from the data storage device.

In other aspects, equipment object creation module 156 receives an equipment definition prior to selecting a BMS device. Equipment object creation module 156 may identify a BMS device of BMS 11 to which the equipment definition applies. For example, equipment object creation module 156 may identify a BMS device that is of the same type of building equipment as the archetypal BMS device used to generate the equipment definition. In various aspects, the BMS device used to generate the equipment object may be selected automatically (e.g., by equipment object creation module 156), manually (e.g., by a user) or semi-automatically (e.g., by a user in response to an automated prompt from equipment object creation module 156).

In some aspects, equipment object creation module 156 creates an equipment discovery table based on the equipment definition. For example, equipment object creation module 156 may create an equipment discovery table having attributes (e.g., columns) corresponding to the variables defined by the equipment definition (e.g., a damper position attribute, a supply air flow rate attribute, etc.). Each column of the equipment discovery table may correspond to a point definition of the equipment definition. The equipment discovery table may have columns that are categorically defined (e.g., representing defined variables) but not yet mapped to any particular data points.

Equipment object creation module 156 may use the equipment definition to automatically identify one or more data points of the selected BMS device to map to the columns of the equipment discovery table. Equipment object creation module 156 may search for data points of the BMS device that satisfy one or more of the point definitions included in the equipment definition. In some aspects, equipment object creation module 156 extracts a search criterion from each point definition of the equipment definition. Equipment object creation module 156 may access a data point network of the building automation system to identify one or more data points associated with the selected BMS device. Equipment object creation module 156 may use the extracted search criterion to determine which of the identified data points satisfy one or more of the point definitions.

In some aspects, equipment object creation module 156 automatically maps (e.g., links, associates, relates, etc.) the identified data points of selected BMS device to the equipment discovery table. A data point of the selected BMS device may be mapped to a column of the equipment discovery table in response to a determination by equipment object creation module 156 that the data point satisfies the point definition (e.g., the search criteria) used to generate the column. For example, if a data point of the selected BMS device has the name "VMA-18. SUP-FLOW" and a search criterion is the text string "SUP-FLOW," equipment object creation module 156 may determine that the search criterion is met. Accordingly, equipment object creation module 156 may map the data point of the selected BMS device to the corresponding column of the equipment discovery table.

In some aspects, equipment object creation module 156 may create multiple equipment objects and map data points to attributes of the created equipment objects in an automated fashion (e.g., without human intervention, with minimal human intervention, etc.). The search criteria provided by the equipment definition facilitates the automatic discovery and identification of data points for a plurality of equipment object attributes. Equipment object creation module 156 may label each attribute of the created equipment objects with a device-independent label derived from the equipment definition used to create the equipment object. The equipment objects created by equipment object creation module 156 may be viewed (e.g., via a UI) and/or interpreted by data consumers in a consistent and intuitive manner regardless of device-specific differences between BMS devices of the same general type. The equipment objects created by equipment object creation module 156 may be stored in equipment objects 144.

Still referring to FIG. 3, the one or more memories 138, individually or in combination, are shown to further include an object relationship module 158. Object relationship module 158 may be configured to establish relationships between equipment objects 144. In some aspects, object relationship module 158 establishes causal relationships between equipment objects 144 based on the ability of one BMS device to affect another BMS device. For example, object relationship module 158 may establish a causal relationship between a terminal unit (e.g., a VMA) and an upstream unit (e.g., an AHU, a chiller, etc.) which affects an input provided to the terminal unit (e.g., air flow rate, air temperature, etc.).

Object relationship module 158 may establish relationships between equipment objects 144 and building objects 142 (e.g., spaces). For example, object relationship module 158 may associate equipment objects 144 with building objects 142 representing particular rooms or zones to indicate that the equipment object serves that room or zone. In some aspects, object relationship module 158 provides a UI through which a user may define relationships between equipment objects 144 and building objects 142. For example, a user may assign relationships in a "drag and drop" fashion by dragging and dropping a building object and/or an equipment object into a "serving" cell of an equipment object provided via the UI to indicate that the BMS device represented by the equipment object serves a particular space or BMS device.

Still referring to FIG. 3, the one or more memories 138, individually or in combination, are shown to further include a building control services module 160. Building control services module 160 may be configured to automatically control BMS 11 and the various subsystems thereof. Building control services module 160 may utilize closed loop control, feedback control, proportional integral (PI) control, model predictive control, or any other type of automated building control methodology to control the environment (e.g., a variable state or condition) within building 10.

Building control services module 160 may receive inputs from sensory devices (e.g., temperature sensors, pressure sensors, flow rate sensors, humidity sensors, electric current sensors, cameras, radio frequency sensors, microphones, etc.), user input devices (e.g., computer terminals, client devices, user devices, etc.) or other data input devices via BMS interface 132. Building control services module 160 may apply the various inputs to a building energy use model and/or a control algorithm to determine an output for one or more building control devices (e.g., dampers, AHUs, chillers, boilers, fans, pumps, etc.) in order to affect a variable state or condition within building 10 (e.g., zone temperature, humidity, air flow rate, etc.).

In some aspects, building control services module 160 is configured to control the environment of building 10 on a zone-individualized level. For example, building control services module 160 may control the environment of two or more different building zones using different setpoints, different constraints, different control methodology, and/or different control parameters. Building control services module 160 may operate BMS 11 to maintain building conditions (e.g., temperature, humidity, air quality, etc.) within a setpoint range, to optimize energy performance (e.g., to minimize energy consumption, to minimize energy cost, etc.), and/or to satisfy any constraint or combination of constraints as may be desirable for various implementations.

In some aspects, building control services module 160 uses the location of various BMS devices to translate an input received from a building system into an output or control signal for the building system. Building control services module 160 may receive location information for BMS devices and automatically set or recommend control parameters for the BMS devices based on the locations of the BMS devices. For example, building control services module 160 may automatically set a flow rate setpoint for a VAV box based on the size of the building zone in which the VAV box is located.

Building control services module 160 may determine which of a plurality of sensors to use in conjunction with a feedback control loop based on the locations of the sensors within building 10. For example, building control services module 160 may use a signal from a temperature sensor located in a building zone as a feedback signal for controlling the temperature of the building zone in which the temperature sensor is located.

In some aspects, building control services module 160 automatically generates control algorithms for a controller or a building zone based on the location of the zone in the building 10. For example, building control services module 160 may be configured to predict a change in demand resulting from sunlight entering through windows based on the orientation of the building and the locations of the building zones (e.g., cast-facing, west-facing, perimeter zones, interior zones, etc.).

Building control services module 160 may use zone location information and interactions between adjacent building zones (rather than considering each zone as an isolated system) to more efficiently control the temperature and/or airflow within building 10. For control loops that are conducted at a larger scale (i.e., floor level) building control services module 160 may use the location of each building zone and/or BMS device to coordinate control functionality between building zones. For example, building control services module 160 may consider heat exchange and/or air exchange between adjacent building zones as a factor in determining an output control signal for the building zones.

In some aspects, building control services module 160 is configured to optimize the energy efficiency of building 10 using the locations of various BMS devices and the control parameters associated therewith. Building control services module 160 may be configured to achieve control setpoints using building equipment with a relatively lower energy cost (e.g., by causing airflow between connected building zones) in order to reduce the loading on building equipment with a relatively higher energy cost (e.g., chillers and roof top units). For example, building control services module 160 may be configured to move warmer air from higher elevation zones to lower elevation zones by establishing pressure gradients between connected building zones.

Figure 4:
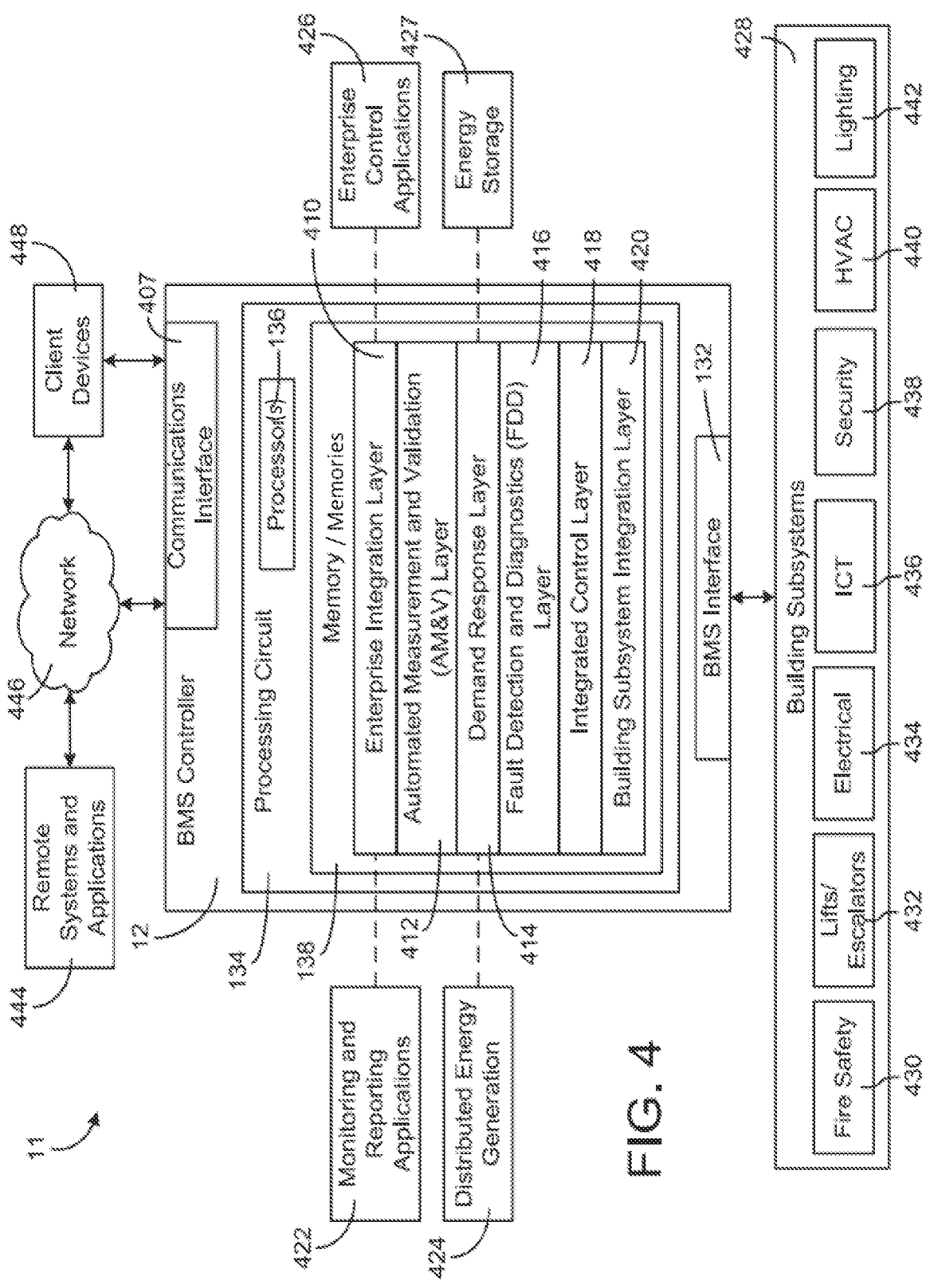
FIG. 4 is another block diagram illustrating a portion of the BMS of FIG. 2 that serves the building of FIG. 1, according to an example aspect of the present disclosure.

Referring to FIG. 4, another block diagram illustrating a portion of BMS 11 that serves building 10 in greater detail is shown, according to some aspects. BMS 11 may be implemented in building 10 to automatically monitor and control various building functions. BMS 11 is shown to include BMS controller 12 and a plurality of building subsystems 428. Building subsystems 428 are shown to include a building electrical subsystem 434, an information communication technology (ICT) subsystem 436, a security subsystem 438, an HVAC subsystem 440, a lighting subsystem 442, a lift/escalators subsystem 432, and a fire safety subsystem 430. In various aspects, building subsystems 428 may include fewer, additional, or alternative subsystems. For example, building subsystems 428 may also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control building 10.

Each of building subsystems 428 may include any number of devices, controllers, and connections for completing its individual functions and control activities. HVAC subsystem 440 may include many of the same components as HVAC system 20, as described with reference to FIGS. 2-3. For example, HVAC subsystem 440 may include a chiller, a boiler, any number of AHUs, economizers, field controllers, supervisory controllers, actuators, temperature sensors, and other devices for controlling the temperature, humidity, airflow, or other variable conditions within building 10. Lighting subsystem 442 may include any number of light fixtures, ballasts, lighting sensors, dimmers, or other devices configured to controllably adjust the amount of light provided to a building space. Security subsystem 438 may include occupancy sensors, video surveillance cameras, digital video recorders, video processing servers, intrusion detection devices, access control devices and servers, or other security-related devices.

Still referring to FIG. 4, BMS controller 12 is shown to include a communications interface 407 and a BMS interface 132. Interface 407 may facilitate communications between BMS controller 12 and external applications (e.g., monitoring and reporting applications 422, enterprise control applications 426, remote systems and applications 444, applications residing on client devices 448, etc.) for allowing user control, monitoring, and adjustment to BMS controller 12 and/or subsystems 428. Interface 407 may also facilitate communications between BMS controller 12 and client devices 448. BMS interface 132 may facilitate communications between BMS controller 12 and building subsystems 428 (e.g., HVAC, lighting security, lifts, power distribution, business, etc.).

Interfaces 407, 132 may be or may include wired or wireless communications interfaces (e.g., jacks, antennas, transmitters, receivers, transceivers, wire terminals, etc.) for conducting data communications with building subsystems 428 or other external systems or devices. In various aspects, communications via interfaces 407, 132 may be direct (e.g., local wired or wireless communications) or via a communications network 446 (e.g., a WAN, the Internet, a cellular network, etc.). For example, interfaces 407, 132 may include an Ethernet card and port for sending and receiving data via an Ethernet-based communications link or network. In another example, interfaces 407, 132 may include a Wi-Fi transceiver for communicating via a wireless communications network. In another example, one or both of interfaces 407, 132 may include cellular or mobile phone communications transceivers. In one aspect, communications interface 407 is a power line communications interface and BMS interface 132 is an Ethernet interface. In other aspects, both communications interface 407 and BMS interface 132 are Ethernet interfaces or are the same Ethernet interface.

Still referring to FIG. 4, BMS controller 12 is shown to include a processing circuit 134 including one or more processors 136 and one or more memories 138. Processing circuit 134 may be communicably connected to BMS interface 132 and/or communications interface 407 such that processing circuit 134 and the various components thereof may send and receive data via interfaces 407, 132. one or more processors 136 may be implemented as a general purpose processor, an application specific integrated circuit (ASIC), one or more field programmable gate arrays (FPGAs), a group of processing components, or other suitable electronic processing components.

One or more memories 138 (e.g., memory, memory unit, storage device, etc.) may include one or more devices (e.g., RAM, ROM, Flash memory, hard disk storage, etc.) for storing data and/or computer code for completing or facilitating the various processes, layers and modules described in the present application. One or more memories 138 may be or may include volatile memory or non-volatile memory. One or more memories 138 may include database components, object code components, script components, or any other type of information structure for supporting the various activities and information structures described in the present application. According to some aspects, one or more memories 138 are communicably connected to one or more processors 136 via processing circuit 134 and, individually or in combination, include computer code for executing (e.g., by processing circuit 134 and/or one or more processors 136, individually or in combination) one or more processes described herein.

In some aspects, BMS controller 12 is implemented within a single computer (e.g., one server, one housing, etc.). In various other aspects BMS controller 12 may be distributed across multiple servers or computers (e.g., that may exist in distributed locations). Further, while FIG. 4 shows applications 422 and 426 as existing outside of BMS controller 12, in some aspects, applications 422 and 426 may be hosted within BMS controller 12 (e.g., within one or more memories 138).

Still referring to FIG. 4, one or more memories 138, individually or in combination, are shown to include an enterprise integration layer 410, an automated measurement and validation (AM&V) layer 412, a demand response (DR) layer 414, a fault detection and diagnostics (FDD) layer 416, an integrated control layer 418, and a building subsystem integration later 420. Layers 410, 412, 414, 416, 418, 420 may be configured to receive inputs from building subsystems 428 and other data sources, determine optimal control actions for building subsystems 428 based on the inputs, generate control signals based on the optimal control actions, and provide the generated control signals to building subsystems 428. The following paragraphs describe some of the general functions performed by each of layers 410, 412, 414, 416, 418, 420 in BMS 11.

Enterprise integration layer 410 may be configured to serve clients or local applications with information and services to support a variety of enterprise-level applications. For example, enterprise control applications 426 may be configured to provide subsystem-spanning control to a GUI or to any number of enterprise-level business applications (e.g., accounting systems, user identification systems, etc.). Enterprise control applications 426 may also or alternatively be configured to provide configuration GUIs for configuring BMS controller 12. In yet other aspects, enterprise control applications 426 may work with layers 410, 412, 414, 416, 418, 420 to optimize building performance (e.g., efficiency, energy use, comfort, or safety) based on inputs received at interface 407 and/or BMS interface 132.

Building subsystem integration layer 420 may be configured to manage communications between BMS controller 12 and building subsystems 428. For example, building subsystem integration layer 420 may receive sensor data and input signals from building subsystems 428 and provide output data and control signals to building subsystems 428. Building subsystem integration layer 420 may also be configured to manage communications between building subsystems 428. Building subsystem integration layer 420 translate communications (e.g., sensor data, input signals, output signals, etc.) across a plurality of multi-vendor/multi-protocol systems.

Demand response layer 414 may be configured to optimize resource usage (e.g., electricity use, natural gas use, water use, etc.) and/or the monetary cost of such resource usage in response to satisfy the demand of building 10. The optimization may be based on time-of-use prices, curtailment signals, energy availability, or other data received from utility providers, distributed energy generation systems 424, from energy storage 427, or from other sources. Demand response layer 414 may receive inputs from other layers of BMS controller 12 (e.g., building subsystem integration layer 420, integrated control layer 418, etc.). The inputs received from other layers may include environmental or sensor inputs such as temperature, carbon dioxide levels, relative humidity levels, air quality sensor outputs, occupancy sensor outputs, room schedules, and the like. The inputs may also include inputs such as electrical use (e.g., expressed in kWh), thermal load measurements, pricing information, projected pricing, smoothed pricing, curtailment signals from utilities, and the like.

According to some aspects, demand response layer 414 includes control logic for responding to the data and signals it receives. These responses may include communicating with the control algorithms in integrated control layer 418, changing control strategies, changing setpoints, or activating/deactivating building equipment or subsystems in a controlled manner. Demand response layer 414 may also include control logic configured to determine when to utilize stored energy. For example, demand response layer 414 may determine to begin using energy from energy storage 427 just prior to the beginning of a peak use hour.

In some aspects, demand response layer 414 includes a control module configured to actively initiate control actions (e.g., automatically changing setpoints) which minimize energy costs based on one or more inputs representative of or based on demand (e.g., price, a curtailment signal, a demand level, etc.). In some aspects, demand response layer 414 uses equipment models to determine an optimal set of control actions. The equipment models may include, for example, thermodynamic models describing the inputs, outputs, and/or functions performed by various sets of building equipment. Equipment models may represent collections of building equipment (e.g., subplants, chiller arrays, etc.) or individual devices (e.g., individual chillers, heaters, pumps, etc.).

Demand response layer 414 may further include or draw upon one or more demand response policy definitions (e.g., databases, Extensible Markup Language (XML) files, etc.). The policy definitions may be edited or adjusted by a user (e.g., via a GUI) so that the control actions initiated in response to demand inputs may be tailored for the user's application, desired comfort level, particular building equipment, or based on other concerns. For example, the demand response policy definitions may specify which equipment may be turned on or off in response to particular demand inputs, how long a system or piece of equipment should be turned off, what setpoints may be changed, what the allowable setpoint adjustment range is, how long to hold a high demand setpoint before returning to a normally scheduled setpoint, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 418 may be configured to use the data input or output of building subsystem integration layer 420 and/or demand response later 414 to make control decisions. Due to the subsystem integration provided by building subsystem integration layer 420, integrated control layer 418 may integrate control activities of the subsystems 428 such that the subsystems 428 behave as a single integrated supersystem. In some aspects, integrated control layer 418 includes control logic that uses inputs and outputs from a plurality of building subsystems to provide greater comfort and energy savings relative to the comfort and energy savings that separate subsystems could provide alone. For example, integrated control layer 418 may be configured to use an input from a first subsystem to make an energy-saving control decision for a second subsystem. Results of these decisions may be communicated back to building subsystem integration layer 420.

Integrated control layer 418 is shown to be logically below demand response layer 414. Integrated control layer 418 may be configured to enhance the effectiveness of demand response layer 414 by enabling building subsystems 428 and their respective control loops to be controlled in coordination with demand response layer 414. in some aspects, this configuration may reduce disruptive demand response behavior relative to conventional systems. For example, integrated control layer 418 may be configured to assure that a demand response-driven upward adjustment to the setpoint for chilled water temperature (or another component that directly or indirectly affects temperature) does not result in an increase in fan energy (or other energy used to cool a space) that would result in greater total building energy use than was saved at the chiller.

Integrated control layer 418 may be configured to provide feedback to demand response layer 414 so that demand response layer 414 checks that constraints (e.g., temperature, lighting levels, etc.) are properly maintained even while demanded load shedding is in progress. The constraints may also include setpoint or sensed boundaries relating to safety, equipment operating limits and performance, comfort, fire codes, electrical codes, energy codes, and the like. Integrated control layer 418 is also logically below fault detection and diagnostics layer 416 and AM&V layer 412. Integrated control layer 418 may be configured to provide calculated inputs (e.g., aggregations) to these higher levels based on outputs from more than one building subsystem.

AM&V layer 412 may be configured to verify that control strategies commanded by integrated control layer 418 or demand response layer 414 are working properly (e.g., using data aggregated by AM&V layer 412, integrated control layer 418, building subsystem integration layer 420, FDD layer 416, or otherwise). The calculations made by AM&V layer 412 may be based on building system energy models and/or equipment models for individual BMS devices or subsystems. For example, AM&V layer 412 may compare a model-predicted output with an actual output from building subsystems 428 to determine an accuracy of the model.

FDD layer 416 may be configured to provide on-going fault detection for building subsystems 428, building subsystem devices (i.e., building equipment), and control algorithms used by demand response layer 414 and integrated control layer 418. FDD layer 416 may receive data inputs from integrated control layer 418, directly from one or more building subsystems or devices, or from another data source. FDD layer 416 may automatically diagnose and respond to detected faults. The responses to detected or diagnosed faults may include providing an alert message to a user, a maintenance scheduling system, or a control algorithm configured to attempt to repair the fault or to work-around the fault.

FDD layer 416 may be configured to output a specific identification of the faulty component or cause of the fault (e.g., loose damper linkage) using detailed subsystem inputs available at building subsystem integration layer 420. In other example aspects, FDD layer 416 is configured to provide "fault" events to integrated control layer 418 which executes control strategies and policies in response to the received fault events. According to some aspects, FDD layer 416 (or a policy executed by an integrated control engine or business rules engine) may shut-down systems or direct control activities around faulty devices or systems to reduce energy waste, extend equipment life, or assure proper control response.

FDD layer 416 may be configured to store or access a variety of different system data stores (or data points for live data). FDD layer 416 may use some content of the data stores to identify faults at the equipment level (e.g., specific chiller, specific AHU, specific terminal unit, etc.) and other content to identify faults at component or subsystem levels. For example, building subsystems 428 may generate temporal (i.e., time-series) data indicating the performance of BMS 11 and the various components thereof. The data generated by building subsystems 428 may include measured or calculated values that exhibit statistical characteristics and provide information about how the corresponding system or process (e.g., a temperature control process, a flow control process, etc.) is performing in terms of error from its setpoint. These processes may be examined by FDD layer 416 to expose when the system begins to degrade in performance and alert a user to repair the fault before it becomes more severe.

Enforcing Security on Devices/Systems Using Device Management Layer

Figure 5:
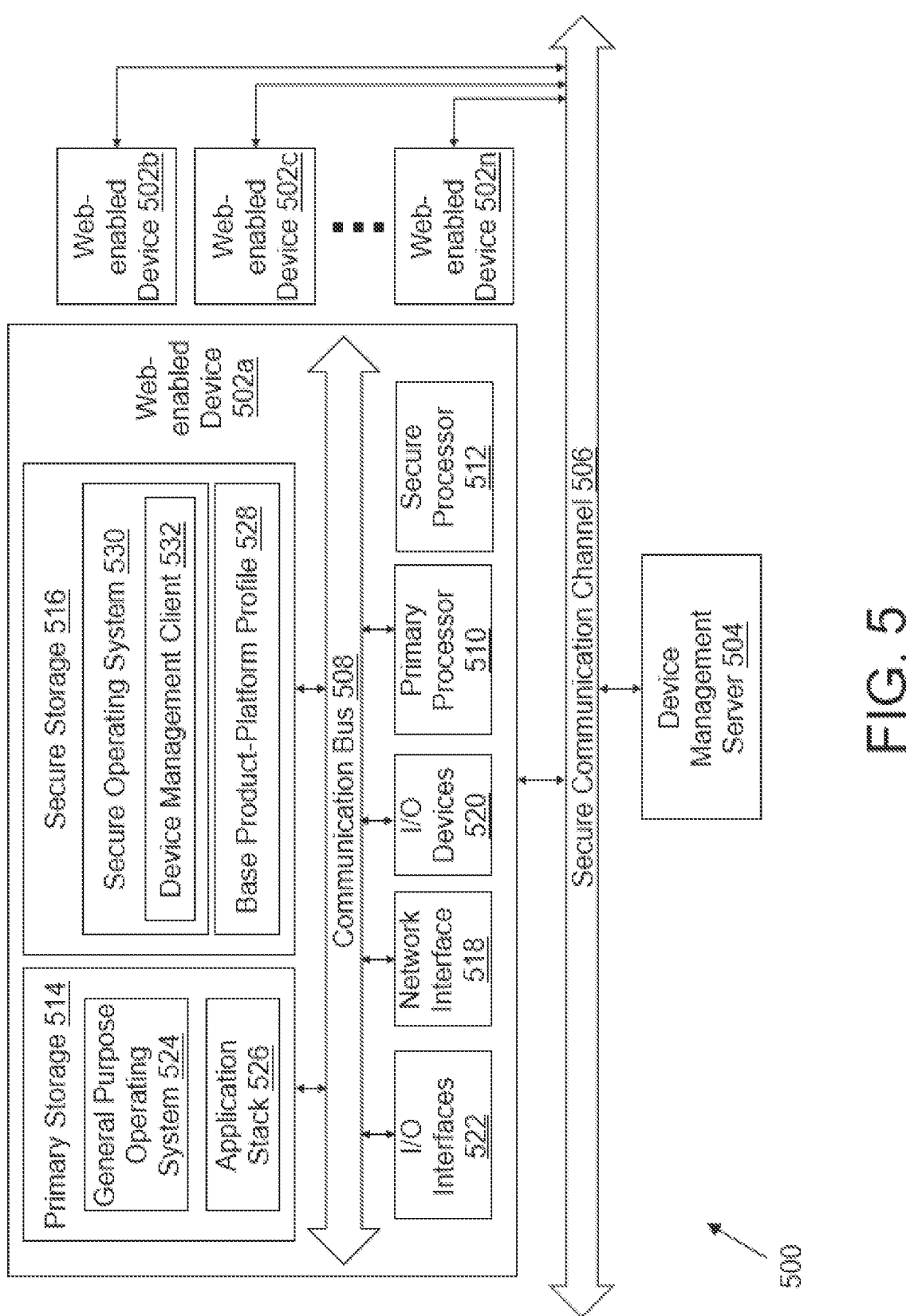
FIG. 5 is a block diagram of a system configured to enforce security using device management layer, according to an example aspect of the present disclosure.

Referring to FIG. 5, a block diagram of a system 500 to enforce security using device management layer is shown, according to an example aspect of the present disclosure. The system 500 includes a plurality of web-enabled devices 502a, 502b, . . . , 502n and a device management server 504. The plurality of web-enabled devices 502a, 502b, . . . , 502n may include, but are not limited to, any of the sensors/devices described herein with references to a BMS 11 that serves a building 10, such as, for example, one or more security devices, video surveillance cameras, fire detectors, smoke detectors, lighting devices, HVAC devices, or other building management devices.

In some aspects, the plurality of web-enabled devices 502a, 502b, . . . , 502n communicate with the device management server 504 over a secure communication channel 506 that uses, for example, a Host Identity Protocol (HIP) or an encrypted communication network. The secure communication channel 506 may be a medium through which content and messages are securely transmitted between the plurality of web-enabled devices 502a, 502b, . . . , 502n and the device management server 504. Examples of the secure communication channel 506 may include, but are not limited to, a Wi-Fi network, a light fidelity (Li-Fi) network, a LAN, a WAN, a metropolitan area network (MAN), a satellite network, the Internet, a fiber optic network, a coaxial cable network, an infrared (IR) network, a radio frequency (RF) network, and combinations thereof.

The web-enabled device 502a, which may be implemented as an IoT device or any other web-enabled system, may include a communication bus 508 or other communication mechanism for communicating information between various components of the web-enabled device 502a. The web-enabled device 502a may further include a primary processor 510 and a secure processor 512 communicatively and operatively coupled to the communication bus 508 for processing information and executing instructions or operations. The primary processor 510 and the secure processor 512 may be any type of general or specific purpose processors.

Although the web-enabled device 502a is shown to include a single primary processor 510, the present aspects are not so limited, and the web-enabled device 502a may include two or more primary processors that, individually or in combination, are configured to perform any functions performed by the primary processor 510 as described herein.

Although the web-enabled device 502*a* is shown to include a single secure processor 512, the present aspects are not so limited, and the web-enabled device 502*a* may include two or more secure processors that, individually or in combination, are configured to perform any functions performed by the secure processor 512 as described herein.

The web-enabled device 502*a* may further include a primary storage 514 and a secure storage 516 for storing information and instructions to be executed by the primary processor 510 and the secure processor 512, respectively.

Although the web-enabled device 502*a* is shown to include a single primary storage 514, the present aspects are not so limited, and the web-enabled device 502*a* may include two or more secure storages that, individually or in combination, are configured to perform any functions performed by the primary storage 514 as described herein.

Although the web-enabled device 502*a* is shown to include a single secure storage 516, the present aspects are not so limited, and the web-enabled device 502*a* may include two or more secure storages that, individually or in combination, are configured to perform any functions performed by the secure storage 516 as described herein.

The primary storage 514 and the secure storage 516 may comprise any combination of RAM, ROM, static storage such as a magnetic or optical disk, or any other type of machine or computer-readable medium. A computer-readable medium may be any available medium (e.g., a non-transitory medium) that may be accessed by the primary processor 510 and the secure processor 512. A computer-readable medium may include both a volatile and nonvolatile medium, a removable and non-removable medium, a communication medium, and a storage medium. A communication medium may include computer readable instructions, data structures, program modules or other data in a modulated data signal such as a carrier wave or other transport mechanism, and may include any other form of information delivery medium known in the art. A storage medium may include RAM, flash memory, ROM, erasable programmable read-only memory (EPROM), electrically erasable programmable read-only memory (EEPROM), registers, hard disk, a removable disk, a CDROM, or any other form of storage medium known in the art.

The web-enabled device 502*a* may further include a network interface 518, for example, a network interface card or other communications interface, to provide access to a network, for example, Internet. As a result, a user may interface with the web-enabled device 502*a* directly, or remotely through a network or any other method. The web-enabled device 502*a* may be part of or be a computer, workstation, server, a mobile computing device, a smart device, a BMS, or other computing device in some aspects. The network interface 518 may be similar to the interfaces 407, 132 described in the foregoing description of FIG. 4.

In some aspects, the web-enabled device 502*a* may further include one or more input/output (I/O) devices 520 (for example, a display, a keyboard, a touchscreen, a cursor control device, a computer mouse, or the like) operatively coupled to the communication bus 508 to enable a user to interface with the web-enabled device 502*a*. In some aspects, the web-enabled device 502*a* may further include one or more I/O interfaces 522 that are configured to communicatively couple the web-enabled device 502*a* to one or more peripheral devices through respective pins. Examples of such an I/O interface 522 includes a general purpose input/output (GPIO) devices.

In some aspects, the primary storage 514 may store one or more software modules or engines that may provide respective functionalities when executed by the primary processor 510. For example, the primary storage 514 may include a general purpose OS 524 and an application stack 526 installed on the web-enabled device 502*a*. The general purpose OS 524 in conjunction with the application stack 526 provide an operating system functionality with required use application for the web-enabled device 502*a*. For example, when the application stack 526 is installed on the web-enabled device 502*a*, various control parameters are set in accordance with the installed application stack 526. Setting the control parameters may include initializing various peripheral devices (e.g., 518, 522, 524), the primary processor 510, ports, software control parameters, the communication buses (e.g., 508), or the like. Setting the control parameters may further include enabling/disabling various peripheral devices (e.g., 518, 522, 524), ports, software control parameters, features, the communication buses (e.g., 508), or the like. The set control parameters are stored as a base product-platform profile 528 in the secure storage 516. In other words, the base product-platform profile 528 may correspond to a data structure including various control parameters that define the states of various hardware and software components of the web-enabled device 502*a* in accordance to the application stack 526. Since the base product-platform profile 528 is stored in the secure storage 516, it may be used as a root of trust.

In some aspects, the secure storage 516 may store one or more software modules or engines that may provide respective functionalities when executed by the secure processor 512. For example, the secure storage 516 may include a secure OS 530. The secure OS 530 may function as a TEE management engine. The secure OS 530 may provide functionality for implementing a TEE, as will be described in more detail below. In some aspects, the secure OS 530 may include a number of modules or engines, where each module provides specific individual functionality for implementing a distributed TEE. As shown in FIG. 5, the secure OS 530 includes a device management client 532, which is a TEE application.

In some aspects, the web-enabled device 502*a* may also be part of a larger system, for example, a BMS. Thus, the web-enabled device 502*a* may include one or more additional functional modules or engines to include the additional functionality.

For the sake of brevity, in FIG. 5, only the internal components of the web-enabled device 502*a* are shown. However, it will be apparent to a person skilled in the art that the other web-enabled devices 502*b*-502*n* may also have components similar to the web-enabled device 502*a*. Further, different web-enabled devices 502*a*-502*n* may have different application stacks installed thereon for implementing different functionalities.

Although the primary storage 514 and the secure storage 516 are shown as two separate storages in FIG. 5, the scope of the disclosure is not limited to it. In some aspects, the secure storage 516 may be a part of the primary storage 514 that is not accessible to the general purpose OS 524.

The device management server 504 may be communicatively coupled to device management client 532 in each of the plurality of web-enabled devices 502*a*, 502*b*, . . . , 502*n* over the secure communication channel 506. In some aspects, the device management server 504 may be implemented as a cloud-based server. In some other aspects, the device management server 504 may be deployed at a remote physical location from the plurality of web-enabled devices 502a, 502b, . . . , 502n. In yet some other aspects, the device management server 504 may be deployed in the same premises as the plurality of web-enabled devices 502a, 502b, . . . , 502n. In some aspects, the device management server 504 may be implemented as a distributed server spread across multiple locations and/or cloud.

The device management server 504 may be configured to receive information pertaining to an attackable profile of an attack from at least one of the plurality of web-enabled devices 502a, 502b, . . . , 502n and flag the attackable profile for the remaining ones of the plurality of web-enabled devices 502a, 502b, . . . , 502n for remediation. Thus, the device management server 504 circulates the attackable profiles among the plurality of web-enabled devices 502a, 502b, . . . , 502n so that if a security breach happens at one site (e.g., at any of the plurality of web-enabled devices 502a, . . . , 502n), other web-enabled devices with similar setup do not remain vulnerable to the same attack, thus preventing the security breach from spreading to other web-enabled devices in an organization's infrastructure.

In operation, when the web-enabled device 502a is booted up (e.g., powered on, transitioned out of a low-power state, re-started, etc.), the secure OS 530 may load the general purpose OS 524 in a TEE. In here, the secure OS 530 may serve as a root of trust. During the secure boot process, the secure OS 530 may utilize the base product-platform profile 528 stored in the secure storage 516 to probe and initialize various hardware and software components/controls of the web-enabled device 502a. Further, the secure OS 530 may provide a copy of the stored base product-platform profile 528 to the device management client 532. The device management client 532, running on the secure OS 530 as a TEE application, may use the base product-platform profile 528 as a master (e.g., known good) copy of the product-platform profile. The device management client 532 may use the received base product-platform profile 528 to dynamically or periodically compare with a real-time product-platform profile of the web-enabled device 502a for determining whether the web-enabled device 502a is being attacked, as described in detail below.

In some aspects, while the web-enabled device 502a is operating after a successful boot, the general purpose OS 524 may further log, record, monitor, or otherwise manage various control parameters of the hardware and/or software components of the web-enabled device 502a to generate (for example, compile) a real-time product-platform profile of the web-enabled device 502a. For example, the general purpose OS 524 may include a compiler configured to use information (e.g., current status of the hardware and/software components of the web-enabled service 502a) presented in a pseudo file system (e.g., "/pros" and/or "/sys") to generate the real-time product-platform profile. The real-time product-platform profile may correspond to a product-platform profile generated by the general purpose OS 524 or the secure OS 530 while the web-enabled device 502a is operating. In other words, the real-time product-platform profile is a run-time data structure that includes various control parameters recorded while the web-enabled device 502a is operating. The recorded control parameters in the real-time product-platform profile may define the current states/status of the hardware and software components of the web-enabled device 502a.

In some other aspects, the real-time product-platform profile may be generated by the secure OS 530 instead of the general purpose OS 524. For example, while the web-enabled device 502a is operating after a successful boot, the secure OS 530 may further log, record, monitor, or otherwise manage various control parameters of the hardware and/or software components of the web-enabled device 502a to generate (for example, compile) the real-time product-platform profile.

The general purpose OS 524 or the secure OS 530 may generate the real-time product-platform profile at periodic time intervals, at random time intervals, or when an update is pushed to the web-enabled device 502a from the device management server 504.

In response to the generation of the real-time product-platform profile, the device management client 532 may be further configured to receive the real-time product-platform profile. In some aspects, the device management client 532 may receive the real-time product-platform profile from a non-trusted execution environment (non-TEE), for example, from the general purpose OS 524. In some other aspects, the device management client 532 may receive the real-time product-platform profile from a TEE, for example, from the secure OS 530.

In some aspects, the device management client 532 may be further configured to compare the control parameters in the base product-platform profile 528 with corresponding control parameters in the real-time product-platform profile to identify if the web-enabled device 502a is being attacked. Based on the comparison, the device management client 532 may determine if any of the control parameters in the base product-platform profile 528 is different from corresponding control parameters in the real-time product-platform profile.

In other words, by comparing the base product-platform profile 528 with the real-time product-platform profile, the device management client 532 may determine status changes in any of the peripherals/interfaces or resources. For example, a malicious program may enable a hardware port that had been disabled purposefully. In such a scenario, control parameter indicating the status of the hardware port in the real-time product-platform profile may not match the corresponding control parameter in the base product-platform profile 528.

The device management client 532 may be configured to detect an attack to the web-enabled device 502a based on at least one of the control parameters in the base product-platform profile 528 being different from a corresponding control parameter in the real-time product-platform profile. In response to detecting the attack to the web-enabled device 502a, the device management client 532 may perform one or more operations to prevent further security breach or recover from the current security breach.

In some aspects, the device management client 532 may be configured to generate one or more alerts to notify a user regarding the attack. In some aspects, the user may be notified via a user device. Examples of user devices may include, but are not limited to, mobile phones, electronic tablets, laptops, desktop computers, workstations, and other types of electronic devices. In some aspects, the user may be notified via a display of the web-enabled device 502a. The generated alert may be indicative of the web-enabled device 502a (e.g., an identifier of the web-enabled device 502a) that is being attacked, a nature of the attack, control parameters changed by the attack, and/or any other available information about the attack. In some aspects, the user may be presented with one or more options along with the alert. For example, the user may be required to choose to evaluate or quarantine the affected web-enabled device 502a, or may choose to halt or limit the operations of the web-enabled device 502a, or parts of the web-enabled device 502a. In some aspects, the device management client 532 may automatically quarantine and/or evaluate the affected web-enabled device 502*a*.

In some aspects, the device management client 532 may be configured to fingerprint, log, record, monitor, or otherwise track at least one of one or more logs, networking behavior, and hardware and software configurations/status of the web-enabled device 502*a* to generate an attackable profile of the detected attack. The attackable profile may be indicative of a state of the web-enabled device 502*a* when it was attacked. For example, the attackable profile may indicate a sequence of changes (for example, sequence of change of control parameters, networking patterns, or the like) that the web-enabled device 502*a* underwent when it was attacked. In an example, the attackable profile may be a data structure generated by the device management client 532. The device management client 532 may be further configured to communicate the generated attackable profile to the device management server 504 via the secure communication channel 506.

In some aspects, in response to receiving the attackable profile from one of the plurality of web-enabled devices 502*a*, 502, . . . , 502*n* (for example, the web-enabled device 502*a*), the device management server 504 may be configured to flag the attackable profile for the remaining ones of the plurality of web-enabled devices 502*b*, . . . , 502*n* for remediation. In other words, the device management server 504 may circulate the received attackable profile among device management clients 532 of the plurality of web-enabled devices 502*a*, 502*b*, . . . , 502*n* so that the other web-enabled devices 502*b*, . . . , 502*n* with similar setup as the web-enabled device 502*a* do not remain vulnerable to the same attack. By flagging the attackable profile, the device management server 504 attempts to prevent the security breach from spreading to other web-enabled devices in an organization's infrastructure. Upon receiving the attackable profile from the device management server 504, device management clients 532 of the other web-enabled devices 502*b*, . . . , 502*n* start to log, record, monitor, or otherwise track one or more logs, networking behavior, and hardware and software configurations/status of corresponding web-enabled devices 502*b*, . . . , 502*n* so as to detect if they are under attack.

Although flagging of the attackable profile is described with respect to the device management server 504, the scope of the disclosure is not limited to it. In some other aspects, the plurality of web-enabled devices 502*a*, . . . , 502*n* may not be connected to the device management server 504. In such a scenario, the plurality of web-enabled devices 502*a*, . . . , 502*n* may be configured to communicate with each other, verify the attackable profile, and generate appropriate alerts if required.

In some aspects, the device management client 532 may be configured to enable a remote debugging feature on the web-enabled device 502*a* for a limited time duration to allow debugging of the web-enabled device 502*a* by an authorized and authenticated remote device admin (not shown) using the secure communication channel 506. In some aspects, the device management client 532 may enable the remote debugging feature so that the authorized and authenticated remote device admin may remotely rectify the changes made to the control parameters during the attack in real-time. Further, while the remote debugging feature is enabled, the device management client 532 may be configured to perform one or more operations to authorize and authenticate the remote device admin trying to connect to the web-enabled device 502*a* using the remote debugging feature. Since the device management client 532 is running on the secure OS 530, the authorization and authentication performed by the device management client 532 is considered as root of trust. Further, the remote debugging feature is only enabled for a limited time duration so as to prevent misuse of the remote debugging feature by an unauthorized or malicious source. After the limited time duration ends, the device management client 532 may be configured to disable the remote debugging feature on the web-enabled device 502*a*. Upon disabling the remote debugging feature, access grant to the web-enabled device 502*a* by the authorized and authenticated remote device admin is terminated.

In some aspects, when the web-enabled device 502*a* is detected to not be under attack, the device management client 532 may be configured to monitor networking behavior, hardware use behavior, and/or application use behavior of the web-enabled device 502*a* over a time period. During this time period, based on the monitored networking behavior, hardware use behavior, and application use behavior, the device management client 532 models a behavior profile of the web-enabled device 502*a*. Behavior profile may be indicative of networking pattern, hardware use pattern, and/or application use pattern of the web-enabled device 502*a* when the web-enabled device 502*a* is not under attack. In some aspects, the device management client 532 may use one or more machine learning or artificial intelligence (AI) models to model the behavior profile indicating the networking pattern, the hardware use pattern, and/or the application use pattern. The device management client 532 may be further configured to analyze the behavior profile to derive optimal networking behavior, hardware use behavior, and application use behavior that may improve the functioning of the web-enabled device 502*a*.

For example, in one non-limiting aspect, the device management client 532 may understand that out of 50 ports that have been enabled as part of the base product-platform profile 528, a user of the web-enabled device 502*a* only uses 30 ports. Even though the remaining 20 ports are open, they are never used by the user. In other words, the device management client 532 using the AI model analyzes the behavior profile to derive what features, settings, resources, etc. are used and not used by user of the web-enabled device 502*a*. Such unused features, settings, resources, etc. may open up security vulnerabilities. Thus, based on such analysis of the modeled behavior profile, the device management client 532 may generate one or more recommendations for the user to modify one or more control parameters in the base product-platform-profile 528 so as to disable the unused features, settings, resources, etc. Further, as the recommendations are generated by the device management client 532 running on the secure OS 530 (e.g., secure processor context), the recommendations are considered to have root of trust.

In some aspects, the device management client 532 may provide the recommendations to the user via a user device. Examples of user devices may include, but are not limited to, mobile phones, electronic tablets, laptops, desktop computers, workstations, and other types of electronic devices. In some aspects, the user may be notified via a display of the web-enabled device 502*a*. The generated recommendations may be indicative of the unused features, settings, resources, and/or any other hardware/software control parameter that has been unused over the period of time and that the user may disable without impacting the current usage. In some aspects, the user may be presented with one or more options to modify the base product-platform-profile 528 so as to disable the unused features, settings, resources, etc. Based on user approval, the device management client 532 may disable the unused features, settings, resources and update the base product-platform-profile 528 stored at the secure storage 516 to reflect the changes and tighten the security controls. Further, after the update, the device management client 532 uses the updated base product-platform-profile 528 to detect attacks.

In some aspects, the device management client 532 may have permission to automatically disable the unused features, settings, resources and update the base product-platform-profile 528 without user approval. In some aspects, the device management client 532 may have partial permission to automatically disable some of the unused features, settings, resources without user approval, and for disabling the remaining unused features, settings, resources, the device management client 532 may require user approval.

In some aspects, the device management client 532 may utilize the generated behavior profile to detect if the web-enabled device 502a is under attack. For example, the device management client 532 may detect a deviation in networking behavior, hardware use behavior, and/or application use behavior of the web-enabled device 502a from the modeled behavior profile. Such deviation may indicate that the web-enabled device 502a is being used abnormally and may be under attack. In such scenarios, even if the real-time product-platform profile matches the base product-platform profile 528, the device management client 532 is able to detect the attacks by monitoring deviations in networking behavior, hardware use behavior, and/or application use behavior from the modeled behavior profile. Thus, monitoring the modeled behavior profile adds another layer of security for detecting and preventing attacks.

In FIG. 5, zero trust device management is achieved by design framework, e.g., by running the device management client 532 on secure OS 530. However, the scope of the disclosure is not limited to achieving zero trust device management by design framework. In some other aspects, zero trust device management may also be achieved by using secure authentication and authorization mechanisms without having to run the device management client 532 on secure OS 530. For example, the device management client 532 may run on general purpose OS 524 with enhanced security. The general purpose OS 524 may be partitioned or have a layer of abstraction for running the device management client 532 such that the device management client 532 is not exposed to security breaches and continues to operate even if the device is under attack.

Referring to FIG. 6, a flow chart of a method 600 to enforce security on a device/system using device management layer is shown, according to some aspects of the present disclosure. In some aspects, operations at blocks 602, 604, 606, 608, 610 of the method 600 may be performed by such as via execution of one or more components of the system 500 shown in FIG. 5. For example, the method 600 may be performed by one or more processors (e.g., 510, 512), individually or in combination, one or more memories (e.g., 514, 516), individually or in combination, and/or device management client 532. The illustrated aspect of the method 600 is merely an example. Therefore, it should be understood that any of a variety of operations may be omitted, re-sequenced, and/or added while remaining within the scope of the present disclosure.

At block 602, the method 600 includes receiving, by a device management client running on a device, a base product-platform profile of the device during a boot-up process of the device, wherein the base product-platform profile indicates one or more control parameters of the device set at a time of installation of an application stack on the device. For example, in an aspect, device 500, one or more processors (e.g., 510, 512), individually or in combination, one or more memories (e.g., 514, 516), individually or in combination, and/or device management client 532 may be configured to or may comprise means for receiving, by a device management client running on a device, a base product-platform profile of the device during a boot-up process of the device, wherein the base product-platform profile indicates one or more control parameters of the device set at a time of installation of an application stack on the device.

For example, base product-platform profile 528 of a web-enabled device (e.g., the web-enabled device 502a) is received during a boot-up process of the web-enabled device 502a. The device management client 532 running on the web-enabled device 502a receives the base product-platform profile 528. In some aspects, the device management client 532 receives the base product-platform profile 528 from a TEE (e.g., the secure storage 516 and/or the secure OS 530). The base product-platform profile 528 indicates one or more control parameters of the web-enabled device 502a set at a time of installation of the application stack 526 on the web-enabled device 502a. In some aspects, the device management client 532 is a TEE application that runs on the secure OS 530 on the web-enabled device 502a such that the secure OS 530 is different from the general purpose OS 524 (for example, as shown in FIG. 5). In some aspects, the secure OS 530 runs on the secure processor 512 that is different from the primary processor 510 on which general purpose OS 524 runs (for example, as shown in FIG. 5).

At optional block 604, the method 600 may further include receiving, by the device management client, the real-time product-platform profile of the device while the device is operating, wherein the real-time product-platform profile indicates one or more control parameters of the device recorded while the device is operating. For example, in an aspect, device 500, one or more processors (e.g., 510, 512), individually or in combination, one or more memories (e.g., 514, 516), individually or in combination, and/or device management client 532 may be configured to or may comprise means for receiving, by the device management client, the real-time product-platform profile of the device while the device is operating, wherein the real-time product-platform profile indicates one or more control parameters of the device recorded while the device is operating.

For example, real-time product-platform profile of the web-enabled device 502a may be received while the web-enabled device 502a is operating. The device management client 532 may receive the real-time product-platform profile. In some aspects, the device management client 532 may receive the real-time product-platform profile from a TEE (e.g., the secure storage 516 and/or the secure OS 530). In some other aspects, the device management client 532 may receive the real-time product-platform profile from a non-TEE (e.g., the primary storage 514 and/or the general purpose OS 524). The real-time product-platform profile indicates one or more control parameters of the web-enabled device 502a recorded while the web-enabled device 502a is operating.

At block 606, the method 600 includes comparing, by the device management client, the one or more control parameters in the base product-platform profile with corresponding one or more control parameters in a real-time product-platform profile of the device. For example, in an aspect, device 500, one or more processors (e.g., 510, 512), individually or in combination, one or more memories (e.g., 514, 516), individually or in combination, and/or device management client 532 may be configured to or may comprise means for comparing, by the device management client, the one or more control parameters in the base product-platform profile with corresponding one or more control parameters in a real-time product-platform profile of the device.

For example, the one or more control parameters in the base product-platform profile 528 are compared with corresponding one or more control parameters in the real-time product-platform profile. The device management client 532 compares the one or more control parameters in the base product-platform profile 528 with corresponding one or more control parameters in the real-time product-platform profile.

At block 608, the method 600 includes detecting, by the device management client, an attack to the device based on at least one of the one or more control parameters in the base product-platform profile being different from a corresponding control parameter in the real-time product-platform profile. For example, in an aspect, device 500, one or more processors (e.g., 510, 512), individually or in combination, one or more memories (e.g., 514, 516), individually or in combination, and/or device management client 532 may be configured to or may comprise means for detecting, by the device management client, an attack to the device based on at least one of the one or more control parameters in the base product-platform profile being different from a corresponding control parameter in the real-time product-platform profile.

For example, an attack to the web-enabled device 502a is detected. The device management client 532 detects the attack to the web-enabled device 502a based on at least one of the one or more control parameters in the base product-platform profile 528 being different from a corresponding control parameter in the real-time product-platform profile.

At optional block 610, the method 600 may further include generating, by the device management client, one or more alerts based on detection of the attack to the device. For example, in an aspect, device 500, one or more processors (e.g., 510, 512), individually or in combination, one or more memories (e.g., 514, 516), individually or in combination, and/or device management client 532 may be configured to or may comprise means for generating, by the device management client, one or more alerts based on detection of the attack to the device.

For example, one or more alerts may be generated based on the detection of the attack to the web-enabled device 502a. The device management client 532 may generate the alerts based on the detection of the attack to the web-enabled device 502a as described in the foregoing description of FIG. 5.

Referring to FIG. 7, a flow chart of a method 700 to enforce security on a device/system using device management layer is shown, according to some aspects of the present disclosure. In some aspects, operations at blocks 702, 704 of the method 700 may be performed by such as via execution of one or more components of the system 500 shown in FIG. 5. For example, the method 700 may be performed by one or more processors (e.g., 510, 512), individually or in combination, one or more memories (e.g., 514, 516), individually or in combination, and/or device management client 532. The illustrated aspect of the method 700 is merely an example. Therefore, it should be understood that any of a variety of operations may be omitted, re-sequenced, and/or added while remaining within the scope of the present disclosure.

At optional block 702, the method 700 may include fingerprinting, by the device management client, upon detecting the attack, at least one of one or more logs, networking behavior, and hardware and software configuration of the device to generate an attackable profile of the attack. For example, in an aspect, device 500, one or more processors (e.g., 510, 512), individually or in combination, one or more memories (e.g., 514, 516), individually or in combination, and/or device management client 532 may be configured to or may comprise means for fingerprinting, by the device management client, upon detecting the attack, at least one of one or more logs, networking behavior, and hardware and software configuration of the device to generate an attackable profile of the attack.

For example, at least one of one or more logs, networking behavior, and hardware and software configuration of a web-enabled device (e.g., the web-enabled device 502a) may be fingerprinted to generate an attackable profile of an attack detected on the web-enabled device 502a. The device management client 532, upon detecting the attack to the web-enabled device 502a, may fingerprint (monitors, records, or tracks) at least one of one or more logs, networking behavior, and hardware and software configuration of the web-enabled device 502a to generate the attackable profile of the attack as described in the foregoing description of FIG. 5.

At optional block 704, the method 700 may further include communicating, by the device management client, the attackable profile to a device management server, wherein the attackable profile is flagged by the device management server for one or more other devices, and wherein the attackable profile is used by the one or more other devices to detect the attack. For example, in an aspect, device 500, one or more processors (e.g., 510, 512), individually or in combination, one or more memories (e.g., 514, 516), individually or in combination, and/or device management client 532 may be configured to or may comprise means for communicating, by the device management client, the attackable profile to a device management server, wherein the attackable profile is flagged by the device management server for one or more other devices, and wherein the attackable profile is used by the one or more other devices to detect the attack.

For example, the attackable profile may be communicated to the device management server 504. The device management client 532 may communicate the attackable profile to the device management server 504 via the secure communication channel 506 that uses at least one of Host Identity Protocol (HIP) or an encrypted communication network. The device management server 504 may further flag the attackable profile for one or more other web-enabled devices 502b, . . . , 502n, and the other web-enabled devices 502b, . . . , 502n may use the flagged attackable profile to detect the attack.

Referring to FIG. 8, a flow chart of a method 800 to enforce security on a device/system using device management layer is shown, according to some aspects of the present disclosure. In some aspects, operations at blocks 802, 804, 806 of the method 800 may be performed by such as via execution of one or more components of the system 500 shown in FIG. 5. For example, the method 800 may be performed by one or more processors (e.g., 510, 512), individually or in combination, one or more memories (e.g., 514, 516), individually or in combination, and/or device management client 532. The illustrated aspect of the method 800 is merely an example. Therefore, it should be understood that any of a variety of operations may be omitted, re-sequenced, and/or added while remaining within the scope of the present disclosure.

At optional block 802, the method 800 may include monitoring, by the device management client, at least one of networking behavior, hardware use behavior, and application use behavior of the device over a time period. For example, in an aspect, device 500, one or more processors (e.g., 510, 512), individually or in combination, one or more memories (e.g., 514, 516), individually or in combination, and/or device management client 532 may be configured to or may comprise means for monitoring, by the device management client, at least one of networking behavior, hardware use behavior, and application use behavior of the device over a time period.

For example, at least one of networking behavior, hardware use behavior, and application use behavior of the web-enabled device 502a may be monitored over a time period. The device management client 532 may monitor at least one of networking behavior, hardware use behavior, and application use behavior of the web-enabled device over a time period as described in the foregoing description of FIG. 5.

At optional block 804, the method 800 may further include modeling, by the device management client, a behavior profile of the device based on the at least one of the networking behavior, the hardware use behavior, and the application use behavior. For example, in an aspect, device 500, one or more processors (e.g., 510, 512), individually or in combination, one or more memories (e.g., 514, 516), individually or in combination, and/or device management client 532 may be configured to or may comprise means for modeling, by the device management client, a behavior profile of the device based on the at least one of the networking behavior, the hardware use behavior, and the application use behavior.

For example, a behavior profile of the web-enabled device 502a may be modeled based on the monitored at least one of the networking behavior, the hardware use behavior, and the application use behavior. The device management client 532 may model the behavior profile of the web-enabled device 502a based on the monitored at least one of the networking behavior, the hardware use behavior, and the application use behavior. In some aspects, the device management client 532 models the behavior profile using an artificial intelligence (AI) model.

At optional block 806, the method 800 may further include modeling, by the device management client, a behavior profile of the device based on the at least one of the networking behavior, the hardware use behavior, and the application use behavior. For example, in an aspect, device 500, one or more processors (e.g., 510, 512), individually or in combination, one or more memories (e.g., 514, 516), individually or in combination, and/or device management client 532 may be configured to or may comprise means for modeling, by the device management client, a behavior profile of the device based on the at least one of the networking behavior, the hardware use behavior, and the application use behavior.

For example, a recommendation to modify at least one control parameter in the base product-platform profile 528 in accordance with the modeled behavior profile may be provided. The device management client 532 may provide the recommendation to modify at least one control parameter in the base product-platform profile 528, for example, to user of the web-enabled device 502a. In some aspects, the device management client 532 may detect an attack to the web-enabled device 502a further based on a deviation in at least one of the networking behavior, the hardware use behavior, and the application use behavior from the modelled behavior profile.

Figure 9:
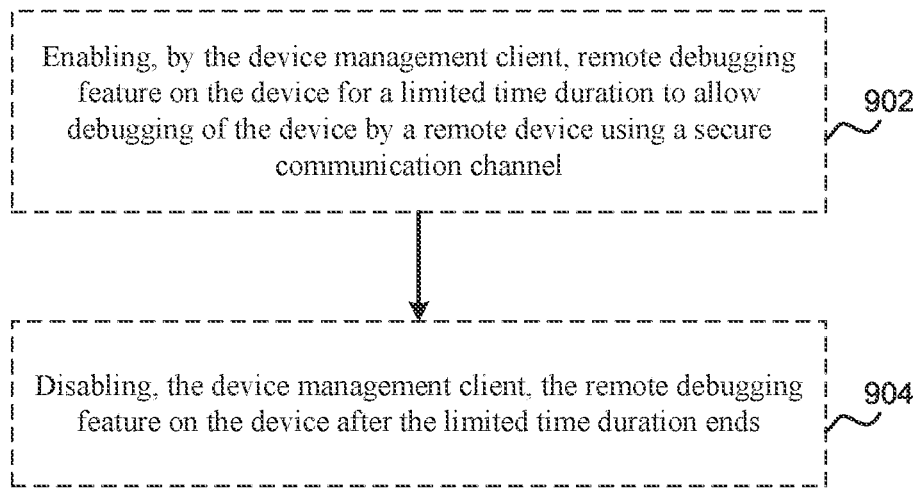
FIG. 9 is a flowchart of a method to allow remote live debugging on a device/system, according to an example aspect of the present disclosure.

Referring to FIG. 9, a flow chart of a method 900 to allow remote live debugging on a web-enabled device is shown, according to some aspects of the present disclosure. In some aspects, operations at blocks 902, 904 of the method 900 may be performed by such as via execution of one or more components of the system 500 shown in FIG. 5. For example, the method 900 may be performed by one or more processors (e.g., 510, 512), individually or in combination, one or more memories (e.g., 514, 516), individually or in combination, and/or device management client 532. The illustrated aspect of the method 900 is merely an example. Therefore, it should be understood that any of a variety of operations may be omitted, re-sequenced, and/or added while remaining within the scope of the present disclosure.

At optional block 902, the method 900 includes enabling, by the device management client, remote debugging feature on the device for a limited time duration to allow debugging of the device by a remote device using a secure communication channel. For example, in an aspect, device 500, one or more processors (e.g., 510, 512), individually or in combination, one or more memories (e.g., 514, 516), individually or in combination, and/or device management client 532 may be configured to or may comprise means for enabling, by the device management client, remote debugging feature on the device for a limited time duration to allow debugging of the device by a remote device using a secure communication channel.

For example, remote debugging feature may be enabled on the web-enabled device 502a for a limited time duration. The device management client 532 may enable remote debugging feature on the web-enabled device 502a for a limited time duration to allow live debugging of the web-enabled device 502a by a remote device admin (not shown) using the secure communication channel 506.

At optional block 904, the method 900 may further include disabling, the device management client, the remote debugging feature on the device after the limited time duration ends. For example, in an aspect, device 500, one or more processors (e.g., 510, 512), individually or in combination, one or more memories (e.g., 514, 516), individually or in combination, and/or device management client 532 may be configured to or may comprise means for disabling, the device management client, the remote debugging feature on the device after the limited time duration ends.

For example, remote debugging feature may be disabled on the web-enabled device 502a after the limited time duration ends. The device management client 532 may disable the remote debugging feature on the web-enabled device 502a after the limited time duration ends as described in the foregoing description of FIG. 5.

The present disclosure offers many technical advancements and advantages. The device management layer (including the device management client 532 and the device management server 504) according to the present disclosure is not just limited to performing traditional operations (such as pushing secure updates, checking live health of a device, or the like). The device management layer according to the present disclosure is implemented as a TEE application (e.g., zero trust device management) and is capable of enforcing security policies throughout the lifetime of a device. Since the device management client 532 runs on secure OS 530 (e.g., secure processor context), attack on general purpose OS 524 (e.g., Linux or any other OS) may never prevent the device management client 532 from running on the web-enabled device 502*a*. Therefore, even if the security of the web-enabled device 502*a* is compromised, the device management client 532 is able to detect the attack and take necessary actions to recover from the security breach or prevent further spread of the security breach. The device management client 532 is further able to generate the attackable profile of the attack and provides it to the device management server 504, which in turn flags the attackable profile as a warning for other devices for remediation. As the communication between the device management server 504 and the device management client 532 happens over the secured communication channel 506 (e.g., based on HIP protocol, airwalled, or encrypted), the communication is secure. Thus, the device management layer (including the device management client 532 and the device management server 504) according to the present disclosure enables prevention and detection of attack.

Some further aspects are provided below in the form of clauses.

1. A method to enforce security, the method comprising:
   receiving, by a device management client running on a device, a base product-platform profile of the device during a boot-up process of the device, wherein the base product-platform profile indicates one or more control parameters of the device set at a time of installation of an application stack on the device;
   comparing, by the device management client, the one or more control parameters in the base product-platform profile with corresponding one or more control parameters in a real-time product-platform profile of the device; and
   detecting, by the device management client, an attack to the device based on at least one of the one or more control parameters in the base product-platform profile being different from a corresponding control parameter in the real-time product-platform profile.

2. The method of clause 1, further comprising receiving, by the device management client, the real-time product-platform profile of the device while the device is operating, wherein the real-time product-platform profile indicates one or more control parameters of the device recorded while the device is operating.

3. The method of clause 1 or 2, wherein the base product-platform profile is received by the device management client from a trusted execution environment (TEE) or from a non-trusted execution environment.

4. The method of any one of the above clauses, further comprising generating, by the device management client, one or more alerts based on detection of the attack to the device.

5. The method of any one of the above clauses, further comprising fingerprinting, by the device management client, upon detecting the attack, at least one of one or more logs, networking behavior, and hardware and software configuration of the device to generate an attackable profile of the attack.

6. The method of clause 5, further comprising communicating, by the device management client, the attackable profile to a device management server, wherein the attackable profile is flagged by the device management server for one or more other devices, and wherein the attackable profile is used by the one or more other devices to detect the attack.

7. The method of clause 6, wherein the communication between the device management client and the device management server is via a secure communication channel that uses at least one of Host Identity Protocol (HIP) or an encrypted communication network.

8. The method of any one of the above clauses, wherein the device management client is a trusted execution environment application that runs on a secure operating system on the device such that the secure operating system is different from a general purpose operating system of the device.

9. The method of clause 8, wherein the secure operating system runs on a first processor that is different from a second processor on which the general purpose operating system runs, and wherein the device is a web-enabled device or an Internet-of-Things (IoT) device.

10. The method of any one of the above clauses, further comprising:
    monitoring, by the device management client, at least one of networking behavior, hardware use behavior, and application use behavior of the device over a time period;
    modeling, by the device management client, a behavior profile of the device based on the at least one of the networking behavior, the hardware use behavior, and the application use behavior; and
    providing, by the device management client, a recommendation to modify at least one control parameter in the base product-platform profile in accordance with the behavior profile.

11. The method of clause 10, wherein the behavior profile is modelled using an artificial intelligence model.

12. The method of clause 10 or 11, wherein the attack to the device is further detected by the device management client based on a deviation in at least one of the networking behavior, the hardware use behavior, and the application use behavior from the behavior profile.

13. The method of any one of the above clauses, further comprising:
    enabling, by the device management client, remote debugging feature on the device for a limited time duration to allow debugging of the device by a remote device using a secure communication channel; and
    disabling, the device management client, the remote debugging feature on the device after the limited time duration ends.

14. The method of any one of the above clauses, wherein the base product-platform profile is compared with the real-time product-platform profile by the device management client on each update of the device or on periodic time intervals.

15. A device comprising one or more memory devices having instructions stored thereon that, when executed by one or more processors, individually or in combination, cause the one or more processors to run a device management client, wherein the device management client is configured to:
    receive a base product-platform profile of the device during a boot-up process of the device, wherein the base product-platform profile indicates one or more control parameters of the device set at a time of installation of an application stack on the device;
    compare the one or more control parameters in the base product-platform profile with corresponding one or more control parameters in a real-time product-platform profile of the device; and
    detect an attack to the device based on at least one of the one or more control parameters in the base product-platform profile being different from a corresponding control parameter in the real-time product-platform profile.

16. The device of clause 15, wherein the device management client is further configured to receive the real-time product-platform profile of the device while the device is operating, wherein the real-time product-platform profile indicates one or more control parameters of the device recorded while the device is operating.

17. The device of clause 15 or 16, wherein the device management client receives the base product-platform profile from a trusted execution environment, and wherein the device management client receives the real-time product-platform profile from a non-trusted execution environment.

18. The device of any one of clauses 15 to 17, wherein the device management client is further configured to communicate with a device management server via a secure communication channel that uses at least one of Host identity protocol (HIP) or an encrypted communication network.

19. The device of clause 18, wherein the device management client is further configured to:

fingerprint, upon detecting the attack, at least one of one or more logs, networking behavior, and hardware and software configuration of the device to generate an attackable profile of the attack; and communicate the attackable profile to the device management server, wherein the device management server is further configured to:

flag the attackable profile for one or more other devices, wherein the one or more other devices use the attackable profile to detect the attack.

20. The device of any one of clauses 15 to 19, wherein the one or more memory devices implement a secure storage, wherein the one or more processors, individually or in combination, are further configured to run a secure operating system on which the device management client runs, and wherein the device management client is a trusted execution environment application.

The construction and arrangement of the systems and methods as shown in the various example aspects are illustrative only. Although only a few aspects have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative aspects. Other substitutions, modifications, changes, and omissions may be made in the design, operating conditions and arrangement of the example aspects without departing from the scope of the present disclosure.

The present disclosure contemplates methods, systems and program products on any machine-readable media for accomplishing various operations. The aspects of the present disclosure may be implemented using existing computer processors, or by a special purpose computer processor for an appropriate system, incorporated for this or another purpose, or by a hardwired system. Aspects within the scope of the present disclosure include program products comprising machine-readable media for carrying or having machine-executable instructions or data structures stored thereon. Such machine-readable media may be any available media that may be accessed by a general purpose or special purpose computer or other machine with a processor. By way of example, such machine-readable media may comprise RAM, ROM, EPROM, EEPROM, CD-ROM or other optical disk storage, magnetic disk storage or other magnetic storage devices, or any other medium which may be used to carry or store desired program code in the form of machine-executable instructions or data structures and which may be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also, two or more steps may be performed concurrently or with partial concurrence. Such variation will depend on the software and hardware systems chosen and on designer choice. All such variations are within the scope of disclosure. Likewise, software implementations could be accomplished with standard programming techniques with rule based logic and other logic to accomplish the various connection steps, processing steps, comparison steps and decision steps.

What is claimed is:

1. A method to enforce security, the method comprising:

receiving, from a trusted environment on a device, by a device management client running as an application in the trusted environment on the device, a base product-platform profile of the device during an initialization process of the device, wherein the base product-platform profile indicates one or more control parameters of the device set at a time of installation of an application stack on the device;

receiving, from a non-trusted environment on the device, by the device management client running as the application in the trusted environment on the device, a real-time product-platform profile of the device while the device is operating after the initialization process of the device is completed;

comparing, by the device management client, the one or more control parameters in the base product-platform profile with corresponding one or more control parameters in the real-time product-platform profile of the device; and detecting, by the device management client, an attack to the device based on at least one of the one or more control parameters in the base product-platform profile being different from a corresponding control parameter in the real-time product-platform profile.

2. The method of claim 1, wherein the real-time product-platform profile indicates one or more second control parameters of the device recorded while the device is operating.

3. The method of claim 1, further comprising generating, by the device management client, one or more alerts based on detection of the attack to the device.

4. The method of claim 1, further comprising fingerprinting, by the device management client, upon detecting the attack, at least one of one or more logs, networking behavior, and hardware and software configuration of the device to generate an attackable profile of the attack.

5. The method of claim 4, further comprising communicating, by the device management client, the attackable profile to a device management server, wherein the attackable profile is flagged by the device management server for one or more other devices, and wherein the attackable profile is used by the one or more other devices to detect the attack.

6. The method of claim 5, wherein communication between the device management client and the device management server is via a secure communication channel that uses at least one of Host Identity Protocol (HIP) or an encrypted communication network.

7. The method of claim 1, wherein the device management client is a trusted execution environment (TEE) application that runs on a secure operating system on the device such that the secure operating system is different from a general purpose operating system of the device.

8. The method of claim 7, wherein the secure operating system runs on a first processor that is different from a second processor on which the general purpose operating system runs, and wherein the device is a web-enabled device or an Internet-of-Things (IOT) device.

9. The method of claim 1, further comprising:
   monitoring, by the device management client, at least one of networking behavior, hardware use behavior, and application use behavior of the device over a time period;
   modeling, by the device management client, a behavior profile of the device based on at least one of the networking behavior, the hardware use behavior, and the application use behavior; and
   providing, by the device management client, a recommendation to modify at least one control parameter in the base product-platform profile in accordance with the behavior profile.

10. The method of claim 9, wherein the behavior profile is modelled using an artificial intelligence model.

11. The method of claim 9, wherein the attack to the device is further detected by the device management client based on a deviation in at least one of the networking behavior, the hardware use behavior, and the application use behavior from the behavior profile.

12. The method of claim 1, further comprising:
   enabling, by the device management client, remote debugging feature on the device for a limited time duration to allow debugging of the device by a remote device using a secure communication channel; and
   disabling, by the device management client, the remote debugging feature on the device after the limited time duration ends.

13. The method of claim 1, wherein the base product-platform profile is compared with the real-time product-platform profile by the device management client on each update of the device or on periodic time intervals.

14. A device comprising one or more memory devices having instructions stored thereon that, when executed by one or more processors, individually or in combination, cause the one or more processors to run a device management client, wherein the device management client is configured to:
   receive, from a trusted environment on the device, by the device management client running as an application in the trusted environment on the device, a base product-platform profile of the device during an initialization process of the device, wherein the base product-platform profile indicates one or more control parameters of the device set at a time of installation of an application stack on the device;
   receiving, from a non-trusted environment on the device, by the device management client running as the application in the trusted environment on the device, a real-time product-platform profile of the device while the device is operating after the initialization process of the device is completed;
   compare the one or more control parameters in the base product-platform profile with corresponding one or more control parameters in the real-time product-platform profile of the device; and
   detect an attack to the device based on at least one of the one or more control parameters in the base product-platform profile being different from a corresponding control parameter in the real-time product-platform profile.

15. The device of claim 14, wherein the real-time product-platform profile indicates one or more second control parameters of the device recorded while the device is operating.

16. The device of claim 14, wherein the device management client is further configured to communicate with a device management server via a secure communication channel that uses at least one of Host identity protocol (HIP) or an encrypted communication network.

17. The device of claim 16, wherein the device management client is further configured to:
   fingerprint, upon detecting the attack, at least one of one or more logs, networking behavior, and hardware and software configuration of the device to generate an attackable profile of the attack; and
   communicate the attackable profile to the device management server, wherein the device management server is further configured to flag the attackable profile for one or more other devices, wherein the one or more other devices use the attackable profile to detect the attack.

18. The device of claim 14, wherein the one or more memory devices implement a secure storage, wherein the one or more processors, individually or in combination, are further configured to run a secure operating system on which the device management client runs, and wherein the device management client is a trusted execution environment (TEE) application.

* * * * *